US007878901B2

(12) United States Patent
Walker et al.

(10) Patent No.: US 7,878,901 B2
(45) Date of Patent: *Feb. 1, 2011

(54) METHODS AND SYSTEMS FOR FACILITATING PLAY AT A GAMING DEVICE BY MEANS OF THIRD PARTY OFFERS

(75) Inventors: Jay S. Walker, Ridgefield, CT (US); James A. Jorasch, Stamford, CT (US); Geoffrey M. Gelman, Stamford, CT (US); Stephen C. Tulley, Fairfield, CT (US); Scott T. Friesen, Stamford, CT (US); Russell P. Sammon, San Francisco, CA (US); Magdalena M. Fincham, Norwalk, CT (US)

(73) Assignee: IGT, Reno, NV (US)

( * ) Notice: Subject to any disclaimer, the term of this patent is extended or adjusted under 35 U.S.C. 154(b) by 561 days.

This patent is subject to a terminal disclaimer.

(21) Appl. No.: 11/422,392

(22) Filed: Jun. 6, 2006

(65) Prior Publication Data
US 2006/0211475 A1 Sep. 21, 2006

Related U.S. Application Data

(63) Continuation of application No. 11/378,199, filed on Mar. 17, 2006, now abandoned, which is a continuation of application No. 10/121,243, filed on Apr. 11, 2002, now Pat. No. 7,094,149, which is a continuation-in-part of application No. 09/521,869, filed on Mar. 8, 2000, now Pat. No. 6,390,917, which is a continuation of application No. 08/769,085, filed on Dec. 18, 1996, now Pat. No. 6,186,893.

(60) Provisional application No. 60/283,080, filed on Apr. 11, 2001, provisional application No. 60/283,074, filed on Apr. 11, 2001, provisional application No. 60/283,081, filed on Apr. 11, 2001.

(51) Int. Cl.
*A63F 9/24* (2006.01)
*G06F 17/00* (2006.01)

(52) U.S. Cl. .................... 463/25; 463/12; 463/16; 463/20; 463/42; 705/5; 705/14.1; 705/14.12; 705/14.19

(58) Field of Classification Search .................. None
See application file for complete search history.

(56) References Cited

U.S. PATENT DOCUMENTS

| | | | |
|---|---|---|---|
| 3,852,576 A | 12/1974 | Rudd | 235/92 GA |
| 4,667,336 A | 5/1987 | Best | 377/15 |
| 4,745,468 A | 5/1988 | Von Kohorn | 358/84 |
| 4,856,787 A | 8/1989 | Itkis | |
| 4,876,592 A | 10/1989 | Von Kohorn | 358/84 |

(Continued)

OTHER PUBLICATIONS

Sims, Calvin, "Centel Acquiring Cellular Phone Unit", The New York Times, May 28, 1988, Section 1, Col. 3, Financial Desk, 2pp.

(Continued)

*Primary Examiner*—M. Sager
(74) *Attorney, Agent, or Firm*—K&L Gates LLP

(57) ABSTRACT

In accordance with embodiments of the present invention an offer is presented to a player (e.g., at a gaming device or a table game in a casino). The offer defines a benefit to be provided in exchange for the player's commitment to an obligation defined by the offer. The offer may be provided once it is determined that a condition of a gaming device satisfies a predetermined criterion. The benefit defined by the offer may be provided to the player and/or to one or more associated persons designated by the player.

158 Claims, 13 Drawing Sheets

U.S. PATENT DOCUMENTS

| | | | |
|---|---|---|---|
| 5,022,172 | A | 6/1991 | Kawahara et al. ............. 40/503 |
| 5,025,372 | A | 6/1991 | Burton et al. ............... 364/406 |
| 5,083,271 | A | 1/1992 | Thacher et al. ............ 364/411 |
| 5,129,652 | A | 7/1992 | Wilkinson |
| 5,229,764 | A | 7/1993 | Matchett et al. ............ 340/5.52 |
| 5,258,837 | A | 11/1993 | Gormley |
| 5,259,613 | A | 11/1993 | Marnell, II ............. 273/138 A |
| 5,283,734 | A | 2/1994 | Von Kohorn ................ 364/412 |
| 5,342,047 | A | 8/1994 | Heidel et al. |
| 5,429,361 | A | 7/1995 | Raven et al. ............ 273/138 A |
| 5,457,306 | A | 10/1995 | Lucero |
| 5,470,079 | A | 11/1995 | LeStrange et al. ....... 273/138 A |
| 5,488,411 | A | 1/1996 | Lewis ............................ 348/8 |
| 5,555,497 | A | 9/1996 | Helbling ..................... 364/401 |
| 5,615,109 | A | 3/1997 | Eder ......................... 395/208 |
| 5,636,346 | A | 6/1997 | Saxe ......................... 395/201 |
| 5,697,844 | A | 12/1997 | Von Kohorn ................ 463/40 |
| 5,721,827 | A | 2/1998 | Logan et al. .......... 395/200.47 |
| 5,759,101 | A | 6/1998 | Von Kohorn ................ 463/40 |
| 5,770,533 | A | 6/1998 | Franchi |
| 5,779,546 | A | 7/1998 | Meissner et al. |
| 5,816,918 | A | 10/1998 | Kelly et al. |
| 5,823,879 | A | 10/1998 | Goldberg et al. |
| 5,971,271 | A | 10/1999 | Wynn et al. |
| 6,021,362 | A | 2/2000 | Maggard et al. ............ 700/234 |
| 6,110,041 | A | 8/2000 | Walker et al. |
| 6,113,493 | A * | 9/2000 | Walker et al. ................. 463/25 |
| 6,119,101 | A | 9/2000 | Peckover ..................... 705/26 |
| 6,142,876 | A | 11/2000 | Cumbers |
| 6,186,893 | B1 | 2/2001 | Walker et al. ................. 463/20 |
| 6,254,482 | B1 * | 7/2001 | Walker et al. ................. 463/25 |
| 6,390,917 | B1 | 5/2002 | Walker et al. ................. 463/20 |
| 6,540,230 | B1 * | 4/2003 | Walker et al. ............... 273/292 |
| 6,561,903 | B2 * | 5/2003 | Walker et al. ................. 463/25 |
| 6,679,497 | B2 * | 1/2004 | Walker et al. ............... 273/292 |
| 6,869,362 | B2 * | 3/2005 | Walker et al. ................. 463/25 |
| 6,890,256 | B2 | 5/2005 | Walker et al. ................. 463/20 |
| 7,094,149 | B2 * | 8/2006 | Walker et al. ................. 463/25 |
| 7,393,279 | B2 * | 7/2008 | Walker et al. ................. 463/25 |
| 7,416,486 | B2 * | 8/2008 | Walker et al. ................. 463/25 |
| 2006/0142078 | A1 * | 6/2006 | Walker et al. ................. 463/20 |
| 2006/0211475 | A1 | 9/2006 | Walker et al. |
| 2006/0211476 | A1 * | 9/2006 | Walker et al. ................. 463/16 |
| 2006/0211477 | A1 * | 9/2006 | Walker et al. ................. 463/16 |

OTHER PUBLICATIONS

Butcher, Lola, "United May Pocket Windfall With Sale of Cellular Business", Kansas City Business Journal, Jun. 6, 1988, Section: vol. 6, No. 38, Section 1, 3pp.

Winter, Christine, "GTE to Sell Par of US Sprint Stake Deal to Shift Another 30% to Partner Untied Telecom", Chicago Tribune, Jul. 19, 1988, Section: Business, p. 2, Zone C, 2pp.

"United Telecommunications Announces Completion of Sale", PR Newswire, Oct. 5, 1988, 2pp.

Henze, Doug, "A Tightening in Cellular Market", Oakland Business Monthly, Aug. 1989, Section 1, vol. 7, No. 8, 6pp.

"United Telecom halts Sprint deal as net falls", Chicago Tribune, Jul. 18, 1990, Section: Business, p. 1, Zone C, 3pp.

Connely, Joanne, "FCC gets spectrum comments; US Federal Communications Commission investigates development of personal communications networks and radio-based technologies", Chilton's Electronic News, Jan. 28, 1991, Section: No. 1845, vol. 37, ISSN: 1054-6847, 3pp.

Manuta, Lou, "Should cellular be deregulated? Cellular radio telephones; Industry Overview", Cellular Marketing, Jan. 1992, Section: vol. 7, No. 1, ISSN: 0890-2402, 6pp.

Rossa, James L., "Cellphones ride roller coaster; American Information Technologies Corp. to cut commission rebates to retailers", HFD-The Weekly Home Furnishings Newspaper, Feb. 3, 1992, Section: vol. 66, No. 5, ISSN: 0746-7885, 3pp.

La Rossa, James Jr., "Ameritech policy stirs debate; executives weigh retailer rebates on eve of Cellular Telecommunications Industry Association Show; American Information Technologies Corp; Special CTIA Show Issue", HFD-The Weekly Home Furnishings Newspaper, Feb. 10, 1992, Section: vol. 66, No. 6, ISSN: 0746-7885, 3pp.

Poe, Janita, "Promoters confident TV viewers eager to cry 'Bingo!'", Chicago Tribune, May 7, 1992, Section: Chicagoland, p. 1, Zone: C, 2pp.

Ziegler, Bart, "Sprint to Merge with Centel", Associated Press, May 28, 1992, Section: Business News, 3pp.

Marek, Sue, "The carrier/retailer love affair—still going strong? Cellular radio industry; Cover Story", Cellular Marketing, Jul. 1992, Section: vol. 7, No. 7, p. 18, ISSN: 0890-2402, 5pp.

"Resale Effect Debate; GAO Faults FCC on Cellular Duopoly Scheme", Communications Daily, Jul. 1992, Section: vol. 12, No. 128, 2pp.

Strandjord, Jeannine M., "Should you bundle 401k services? Employee Benefits", Financial Executive, Sep. 1992, Section: vol. 8, No. 5, p. 45, ISSN: 0895-4186, 6pp.

Brown, Bob and Wallace, Bob, "AT&T bid fro McCaw to reshape landscape; Gives dominant carrier access to rapidly evolving market and opportunity to influence, drive, change.", Network World, Nov. 9, 1992, Section: Top News, 3pp.

Avril, Tom, "Centel Confident of Victory After Vote on Sprint Merger", Dec. 2, 1992, Section: Business News., 3pp.

Avril, Tom, "Communications; Centel Investors Vote on Sprint Merger", The Commercial Appeal, Dec. 3, 1992, Section: Business, p. B4, 2pp.

Oloroso Jr., Arsenio, "Centel holds its breath; Shareholders wait to see outcome of Sprint deal", Crain's Chicago Business, Dec. 7, 1992, 2pp.

Turcsik, Richard, "Recycling-slot machine is tested at A&P unit.", Supermarket News, Dec. 21, 1992, Section: vol. 42, No. 51, p. 17, ISSN: 0039-5803, 2pp.

Yates, Ronald E., "Sprint-Centel merger complete despite fears", Chicago Tribune, Mar. 10, 1993, Section: Business, p. 1, Zone N, 3pp.

Wenske, Paul, "Sprint's big deal", Ingram's, May 1993, Section: vol. 19, No. 5, 8pp.

"Petition Criticized; Fight on CPE Unbundling for IXC Resellers Launched by Major Retailers", Communications Daily, Aug. 10, 1993, Section: vol. 13, No. 153, 2pp.

DeFebo, Carl Jr., "Sprint opens first superstore in Mechanicsburg", Central Penn Business Journal, Nov. 3, 1993, Section: vol. 9, No. 22, Section 1, 3pp.

"Testimony Feb. 8, 1994, John V. Roach Consumer Electronics Retailers Coalition House Energy/Telecommunications and Finance Antitrust Reform Act of 1993", Federal Document Clearing House Congressional Testimony, Feb. 8, 1994, 8pp.

"Sprint—Company Data", Securities and Exchange Commission Form 10-Q, for the quarterly period ended Mar. 31, 1994, 5pp.

"Form 10-K Sprint Corp—FON", Filed Mar. 15, 1994 (period Dec. 31, 1993), 8pp.

Kraemer, Joseph S., "Local competition; Changing Ground Rules for Network Access", Business Communications Review, Sep. 1994, Section: vol. 24, No. 9, p. S4, ISSN: 0162-3885, 10pp.

Steward, Shawn, "Activating the masses", Cellular Business, Oct. 1994, Section: vol. 11, No. 10, pp. 72-80, ISSN: 0741-6520, CODEN: COHE, 6pp.

"Sprint—Defining the Communications Company of the Future 1994 Annual Report to Shareholders", Document Date: Dec. 31, 1994, Filing Date: Mar. 22, 1995, 36pp.

"Inside Sprint Corporation: 1994 Competitive Market Developments", Inside Telecom, Jul. 17, 1995, 7pp.

Gillen, Marilyn A., "Ads Begin To Pop Up in CD-ROMs, Games; Ads begin in video & games and CD-ROM", Billboard, Mar. 25, 1995, p. 58, ISSN: 0006-2510, 4pp.

Rich, Laura, "All aboard the brand train: Gannett is confident national advertisers will take a ride on its NYC subway program", Inside Media, Mar. 29, 1995, Section: p. 26, ISSN: 1046-5316, 3pp.

"Tandy Corp—Form-Type ARS", Document Date: Dec. 31, 1995, Filing Date: Apr. 10, 1996, 90pp.

"Sprint Completes Spin-Off of It's Cellular Subsidiary", Chicago Sun-Times, Mar. 8, 1996, Section: Financial, 2pp.

"DCI Telecommunications Inc. Announces Merger Discussion", PR Newswire, Mar. 15, 1996, Section: Financial News, 3pp.

"Securities and Exchange Commission Form 10-K/A, 360 Degrees Communications Co Cross-Reference: Sprint Cellular Co", for the fiscal year ended Dec. 31, 1995, Filing date: Apr. 16, 1996, 23pp.

"Australian Interactive Television Could Include Gambling on Demand", Computergram International, May 2, 1996, ISSN: 0268-716X, 2pp.

Press Release: "Sprint, Sprint Spectrum and Radio Shack Join Forces", New York, NY, Sep. 11, 1996, 9pp.

Maxon, Terry, "Tandy pairs with Sprint for venture; Companies will offer expanded offering of telecommunications products, services", The Dallas Morning News, Sep. 12, 1996, Section: Business; 3pp.

Hopper, Kathryn, "Tandy, Sprint to offer one-stop phone shopping", Fort Worth Star-Telegram, Sep. 12, 1996, Section: News, 4pp.

Hilzenrath, David S., "Change Is Good, They Bet; CyberCash Has the Product. Now if Only Nickel-and-Dime Transactions Would Take Off" The Washington Post, Oct. 21, 1996, Section: Financial, 6pp.

"Tandy Corporation—Quarterly Report", For the quarterly period ended Sep. 30, 1996, Filed Nov. 12, 1996, 36pp.

Ling, Teh Hooi, "Prices of handphones dive, thanks to cross-subsidies", Business Times, Apr. 8, 1998, 2pp.

"FYI; Calls are free, after the ads", Star Tribune (Minneapolis, MN), Jan. 14, 1999, 1pg.

Ellin, Abby, "Personal Business: Listening to an Earful", The New York Times, Jan. 24, 1999, Section 3, p. 11, Col. 1, Money and Business/Financial Desk, 3pp.

"Discounts, Without Strings (Or Wires)", Wireless Week, Apr. 24, 2000, Section: Paging/Messaging, 1pg.

Slavick, Frank, "Eyes North", Billing World, May 2000. 8pp.

Baard, Erik, "Here and Now.", Chief Executive (U.S.), Aug. 1, 2000, Section: p. 42, ISSN: 0160-47241, 7pp.

"A one-stop-shop for credit", Cards International, Aug. 21, 2000, 3pp.

Alleman, James and Cole, Larry, "The International Handbook of Telecommunications Economics, vol. III, Sprint—GTE's lost opportunity", Edward Elgar Publishers, 2002, Chapter 10, 13pp.

King, Suzanne and Hayes, David, "Sprint PCS has played key role in cell phone boom", Posted: Jan. 6, 2002, 10pp.

Website: "Partner Sites—Best-Credit-Deals.com", (http //www best-credit-card-deals com/links_6 html), download date: Nov. 8, 2002, 4pp.

Website: "Yahoo! Games—Welcome, Guest Yahoo! Games", (http //games yahoo com/), download date: Nov. 8, 2002, 2pp.

Website: "Yahoo! Games-Chess", (http //games yahoo com/games/login2?page=ch), download date: Nov. 8, 2002, 2pp.

Website: "Yahoo! Help—Games—How do I start playing?", (http //help yahoo com/help/us/games/games-12 html), download date: Nov. 8, 2002 1pg.

Website: "Yahoo! Help—Games—Top 5 Questions", (http //help yahoo com/help/us/games/), download date: Nov. 8, 2002, 2pp.

Website: "Yahoo! Loan Center", (http //loans yahoo com/), download date: Nov. 8, 2002, 1pg.

Website: "The Yahoo! Titanium Visa® Card", download date: Nov. 8, 2002, 1pg.

"Examiner's Affidavit", Affidavit of USPTO, Apr. 11, 2003, 1pg.

Website: "Sprint 1995 Annual Report—Notes to Consolidated Financial Statements", (http //www sprint com/sprint/annual/95/finance/p_52a html), download date Oct. 21, 2003, 1pg.

Website: "Sprint/History", (http www sprint com/sprint/ir/sd/timeline_02 html), download date: Oct. 22, 2003, 2pp.

Website: "Surviving the Great Depression", (http //www geocities com/Athens/Column/4735/clbrown2 html), download date: Nov. 13, 2003, 2pp.

Website: "The Mobile: 20 Years Young", (http: //motoinfo Motorola com/motoinfo/20$^{th}$_anniversary/docs/timeline pdf), download date: Jan. 9, 2004, 2pp.

Website: "Qualcomm About Qualcomm—History / Key Milestones", (http www qualcomm com/about/history/ html), download date: Jul. 27, 2004, 5pp.

* cited by examiner

| PLAYER IDENTIFIER 502 | NAME 504 | FINANCIAL ACCOUNT IDENTIFIER 506 | ASSOCIATED PERSON 508 | SECURITY PHRASE 510 |
|---|---|---|---|---|
| P-123456 | MARY SUE | 1111-2222-3333-4444 | A-01-987 | SAGE22 |
| P-234567 | JULIE BLACK | 297-00-928 | A-03-876 | - |
| P-345678 | BOB SMITH | N/A | NONE IDENTIFIED | 999-22-8888 |

| DEMOGRAPHIC INFORMATION 512 | THEORETICAL WIN 514 | ACTUAL WIN/(LOSS) 516 | COMP. POINTS 518 | AVERAGE WAGER 520 |
|---|---|---|---|---|
| FEMALE, AGE 47 | $3,512 | $4,209 | 132 | $0.50 |
| FEMALE, AGE 20-25 | $282 | $312 | 87 | $2.00 |
| MALE, AGE 68 | $12,802 | $10,090 | 229 | $6.32 |

FIG. 5

| ASSOCIATED PERSON IDENTIFIER 602 | NAME 604 | CONTACT INFORMATION 606 | SPECIAL DATE 608 | SPECIAL DATE DESCRIPTION 610 |
|---|---|---|---|---|
| A-01-987 | JOHN DOE | 703-555-9999 | SEPT. 1 | BIRTHDAY |
| | | | DEC. 25 | CHRISTMAS |
| A-03-876 | BOB SMITH | SMITH@BOB.COM | APRIL 5 | WEDDING ANIVERSARY |
| A-07-654 | ST. JOHN'S CHURCH | 5 HOLY LANE SMALLTOWN, USA | NONE | NONE |
| A-01-432 | CANCER RESEARCH FUND | DONATION DEPT. P.O. BOX 333 BIG CITY, USA | JUNE 2 | NATIONAL CANCER SURVIVOR'S DAY |

| OFFER IDENTIFIER 700 | BENEFIT 702 | OBLIGATION 704 | PLAYER-RELATED PREREQUISITE 706 | OFFER CRITERION 708 | SUBSIDIZING ENTITY IDENTIFIER 710 | PENALTY 712 |
|---|---|---|---|---|---|---|
| O-23-498 | TOP JACKPOT DOUBLED FOR FIRST 10 GAMES OF NEXT 7 SESSIONS | PLAY 1HR/DAY FOR NEXT 7 DAYS | PLAYER A GUEST OF HOTEL CASINO FOR NEXT 7 DAYS | PLAYER INSERTS CARD | S-008 | TOP JACKPOT REDUCED 50% FOR NEXT SESSION |
| O-11-222 | FREE 13" TELEVISION | FILL OUT CREDIT CARD APPLICATION FOR CREDIT CARD COMPANY X | PLAYER NOT A CURRENT COMPANY X CREDIT CARD HOLDER | BALANCE < MAX. COIN BET AMOUNT | S-900 | RETURN OF BENEFIT |
| O-79-555 | $20 IN COINS | TBD | NONE | ADJACENT GAMING DEVICE DISPENSES PAYOUT > $50 | S-008 | $20 |
| O-99-001 | TBD | PLAY FOR AN ADDITIONAL 60 MINS. | NONE | CURRENT TIME BETWEEN 12 AM AND 8 AM | S-008 | N/A |

FIG. 7

| PLAYER IDENTIFIER 802 | GAMING DEVICE IDENTIFIER 804 | RATE OF PLAY 806 | DURATION OF PLAY 808 | THEORETICAL WIN 810 | ACTUAL WIN/(LOSS) 812 | AVERAGE WAGER 814 |
|---|---|---|---|---|---|---|
| P-345678 | M234 | 6 PLAYS/MIN. | 1:05 | $58 | ($115) | $3.00 |
| P-123456 | M532 | 10 PLAYS/MIN. | 2:58 | $63 | $10 | $0.75 |

FIG. 8

| SUBSIDIZING ENTITY IDENTIFIER 902 | SUBSIDIZING ENTITY NAME 904 | ACCOUNT 906 | CONTACT INFORMATION 908 | RANK 910 |
|---|---|---|---|---|
| S-900 | CREDIT CARD COMPANY X | BANK ACCOUNT # 2345678 | 422 STATE ST. | 1 |
| S-721 | CAR DEALER Y | MC 2222-4444-666-8888 | 336 MAIN ST. | 2 |
| S-724 | LONG DISTANCE COMPANY W | PREPAID BALANCE: $10,500 | 85 ELM ST. | 3 |
| S-008 | CASINO | INTERNAL ACCT. 5028 | 90 GAMBLING LN. | 4 |

FIG. 9

| PLAYER IDENTIFIER 1002 | OFFER IDENTIFIER 1004 | ASSOCIATED PERSON 1006 | STATUS OF OBLIGATION 1008 | STATUS OF BENEFIT 1010 |
|---|---|---|---|---|
| P-123456 | O-99-214 | A-01-987 | SATISFIED | PROVIDED |
| P-234567 | O-88-222 | A-03-876 | FAILED | PROVIDED |
| P-345678 | O-52-901 | NONE IDENTIFIED | IN PROGRESS | NOT PROVIDED |
| P-456789 | O-21-000 | A-09-667 | PENDING | NOT PROVIDED |
| P-567890 | O-72-900 | A-03-876 | SATISFIED | PROVIDED |
| P-678901 | O-59-111 | A-07-999; A-02-222; A-01-999 | IN PROGRESS | PROVIDED |

METHODS AND SYSTEMS FOR FACILITATING PLAY AT A GAMING DEVICE BY MEANS OF THIRD PARTY OFFERS

This application is a continuation application of U.S. patent application Ser. No. 11/378,199, filed Mar. 17, 2006 now abandoned in the name of Walker et al. and entitled METHODS AND SYSTEMS FOR FACILITATING PLAY AT A GAMING DEVICE BY MEANS OF THIRD PARTY OFFERS;

which is a continuation application of U.S. application Ser. No. 10/121,243, filed Apr. 11, 2002 now U.S. Pat. No. 7,094,149 in the name of Walker et al. and entitled METHODS AND SYSTEMS FOR FACILITATING PLAY AT A GAMING DEVICE BY MEANS OF THIRD PARTY OFFERS, which application:

(a) claims the benefit of provisional patent application (i) Ser. No. 60/283,080, filed Apr. 11, 2001, entitled "PREVENTING UNDETECTED SUBSTITUTION AT SLOT MACHINES"; (ii) Ser. No. 60/283,074, filed Apr. 11, 2001, entitled "CROSS SUBSIDY SLOT MACHINES"; and (iii) Ser. No. 60/283,081, filed Apr. 11, 2001, entitled "WIN COMPS FOR FRIENDS"; and (b) is a continuation-in-part application of U.S. patent application Ser. No. 09/521,869, entitled SLOT MACHINE ADVERTISING/SALES SYSTEM AND METHOD, filed Mar. 8, 2000 now U.S. Pat. No. 6,390,971 in the name of Walker et al., which is a continuation application of U.S. patent application Ser. No. 08/769,085, entitled SLOT MACHINE ADVERTISING/SALES SYSTEM AND METHOD, filed Dec. 18, 1996 in the name of Walker et al. and issued Feb. 13, 2001 as U.S. Pat. No. 6,186,893.

The content of each of the above applications is incorporated by reference herein for all purposes.

CROSS-REFERENCE TO RELATED APPLICATIONS

This application is related to the following co-pending U.S. Patent Applications:

U.S. patent application Ser. No. 10/120,529, entitled "METHOD AND APPARATUS FOR OFFERING FORWARD COMMITMENT AGREEMENTS", filed Apr. 10, 2002 in the name of Walker et al.;

U.S. patent application Ser. No. 10/112,712, entitled "SYSTEM AND METHOD FOR ADVERTISING/SALES AT A GAMING DEVICE", filed Mar. 29, 2002 in the name of Walker et al., and issued as U.S. Pat. No. 6,890,256 on May 10, 2005.

The content of the above is incorporated by reference herein for all purposes.

FIELD OF THE INVENTION

The present invention relates to methods and apparatus for operating gaming devices. More specifically, the present invention relates to the provision, at a gaming device, of offers that define a benefit in exchange for a commitment to an obligation.

BACKGROUND OF THE INVENTION

Gaming devices such as slot machines generate billions of dollars of revenue per year for casinos located in the United States and other countries. Typically, a casino generates well over half of its revenue from gaming devices. The profit a casino realizes from a player playing at a gaming device tends to increase as the duration of the player's play session at the gaming device increases. Accordingly, casinos are acutely interested in increasing the duration of a player's play session at a gaming device. Unfortunately most players who play a gaming device have limited funds or a fixed budget, which tends to limit the duration of the play session. Most players would welcome the opportunity to increase the amount of funds they have available for playing the gaming device and/or to offset any losses they may have incurred while playing the gaming device. Further, a player's attention is typically focused on the gaming device the player is playing, making the player susceptible to respond to any offers that may be presented to the player via the gaming device.

The acquisition of new customers and the inducement of the return of previous customers is a key concern for most businesses. Businesses tend to set a monetary budget to be spent on the achievement of these goals. This budget is typically spent on advertising of the business to potential customers. However, the effectiveness of most advertising (even targeted advertising) is less than ideal. This is partly due to the fact that most people are typically bombarded with a multitude of advertisements for a variety of businesses at any given time. Adding to the lack of satisfactory effectiveness of conventional advertising is the fact that many people are presented with advertisements at a time when they are not sufficiently motivated to act on the advertisement (e.g. by purchasing the product or visiting the merchant being advertised). Further, even if the viewer of the advertisement is interested in the subject of the advertisement, the viewer tends to get distracted and forget about acting on the advertisement as time passes. Thus a need exists for an improved method for businesses to acquire new customer and/or induce the return of previous customers.

BRIEF DESCRIPTION OF THE DRAWINGS

FIG. 5 is a table illustrating an exemplary data structure of a player database;

FIG. 6 is a table illustrating an exemplary data structure of an associated person database;

FIG. 7 is a table illustrating an exemplary data structure of an offer database;

FIG. 8 is a table illustrating an exemplary data structure of a play session database;

FIG. 9 is a table illustrating an exemplary data structure of a subsidizing event database;

FIG. 10 is a table illustrating an exemplary data structure of an accepted offer tracking database.

DETAILED DESCRIPTION OF THE INVENTION

1. Introduction

Figure 1:
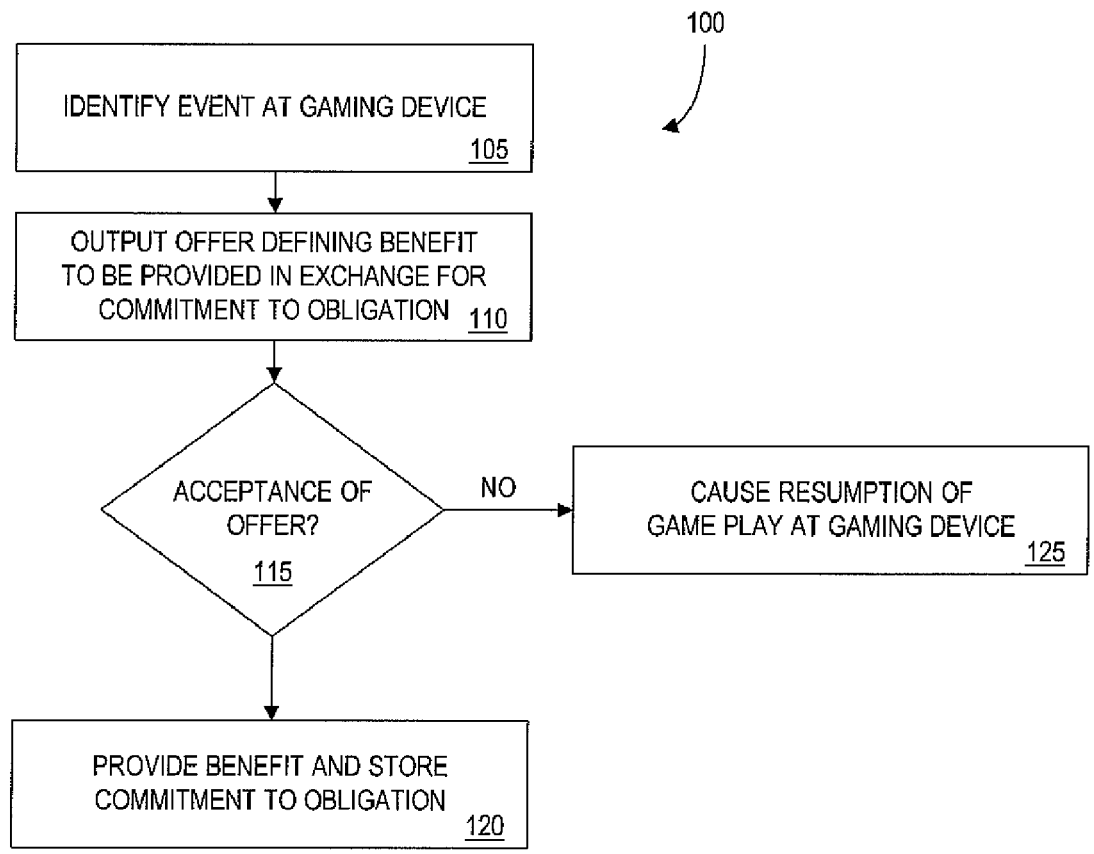
FIG. 1 comprises a flow diagram illustrating an exemplary process according to an embodiment of the present invention.

In accordance with embodiments of the present invention a player of a gaming device or table game in a casino environment is provided with an offer. The offer defines a benefit to be provided in exchange for the player's commitment to an obligation. An example of a benefit is a number of coins dropped into a coin tray of a gaming device the player is playing when presented with the offer. An example of an obligation the player need commit to in order to obtain a benefit is filling out an application for a credit card from a credit card issuer. The offer is subsidized by a subsidizing entity (e.g., a credit card issuer in the above example). The offer may be presented to the player upon the occurrence of a predefined event or condition (e.g., when the credit balance of the gaming device the player is playing reaches zero). Once it is determined that the player has agreed to commit to the obligation defined by the presented offer (e.g., the player has accepted the offer by touching a specified area of a touch screen associated with the gaming device) the benefit may be provided to the player. In other embodiments the benefit may not be provided to the player until the player fulfills the obligation.

Applicants have recognized that a need exists for systems and methods that help merchants and other entities facilitate automated sales, acquire new customers, entice the return of previous customers, and establish relationships with customers. One benefit of embodiments of the present invention is that they allow a merchant's customer acquisition budget to be used for direct acquisitions, rather than for uncertain advertising campaigns. The present invention also reduces the dependency on labor in acquiring and selling to customers. In other words, using the present invention, merchants have an alternative to retaining and training sales staff to acquire and sell to customers.

Another benefit of embodiments of the present invention is that it allows the offer of an obligation and a corresponding benefit at a time when a potential customer/player of a gaming device may be particularly motivated to accept the benefit and/or commit to the obligation. Yet another benefit of embodiments of the present invention is that the potential customer/player of a gaming device receives an immediate, tangible benefit at a time when he may most need it.

The present invention may be more fully understood with reference to the following drawings. In the following description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense but as an illustration of embodiments of the present invention. For example, although many of the embodiments are illustrated herein as involving a gaming device, a gaming device is not necessary for the implementation of the present invention. For example, offers of the present invention may be presented to a player of a table game in a casino. In such an embodiment the offers may be presented to a player via a screen or microphone associated with the table game or via a verbal presentation from a dealer or other casino employee.

It should be noted that in the description herein the term "gaming device" shall refer to any gaming machine, including a slot machine, a video lottery terminal, a video poker machine, a video bingo machine, a video keno machine, a video blackjack machine, etc. that is capable of dispensing value in the form of cash and/or gambling tokens. Gaming devices may or may not be owned by a casino and/or may or may not exist within a casino.

The term "casino" shall refer to the owner of gaming devices, owners' agents, an owner or operator of an online "virtual" casino, owner, distributor or developer of software that simulates a casino and/or any entity who may profit from players' use of the gaming devices.

Referring now to FIG. 1, a flow diagram illustrates an exemplary process 100 according to an embodiment of the present invention. The process 100 begins when an event is identified at a gaming device (step 105). The event may be identified by the gaming device itself or by a controller in communication with the gaming device. Events and other conditions that may trigger an output of an offer are described in detail below. Once the event is identified, an offer is output to a player of the gaming device (step 110). The offer defines a benefit to be provided to a player as well as an obligation the player must commit to in exchange for obtaining the benefit. Benefits and obligations are described in more detail below. An offer may be presented to a player by, for example, pausing a game the player is currently playing at the gaming device and visually and/or audibly presenting the offer to the player during the pause. For example, a visual presentation of the offer may be presented to the player via a screen that is also used to present game outcomes to the player. In other embodiments a visual presentation may be presented to a player via a screen other than the screen used to present game outcomes to a player.

If it is determined that the player has accepted the offer (step 115) the benefit defined by the offer is provided to the player (e.g., coins are dropped into the coin tray of the gaming device) and an indication of the player's commitment to the obligation is stored (step 120). In some embodiments the benefit may not be provided to the player until the player actually fulfills the obligation. An indication of the player's commitment may be stored in a database for use in, for example, determining whether the player has fulfilled the obligation in a satisfactory manner (e.g., within a specified period of time) and/or whether a penalty should be assessed to the player if the player fails to fulfill the obligation. An indication of a player's commitment to an offer may also be stored for future reference regarding, for example, what types of commitment are accepted by players in general and/or by this particular player.

A player may signal an acceptance of the offer in various ways. For example, a player may touch an area of a touch screen labeled "accept" or actuate an acceptance button on the gaming device. In other embodiments the player may signal acceptance by beginning to fulfill the obligation (e.g., if the obligation is to answer a set of survey questions). If an acceptance of the offer is not received (or a rejection of the offer is received) the resumption of play at the gaming device may be caused (step 125). In other embodiments the resumption of play by the player may signal a rejection of the offer. In some embodiments a second offer or the first offer in an altered form may be presented to the player. Various other embodiments of the present invention are described below. An example of an implementation of the present invention follows:

John, a loyal player of the "lucky slots" game in "good times" casino, sits down at a slot machine and inserts his player tracking card. The slot machine reads the player identifier on the player tracking card and communicates it to a slot server. John inserts $20.00 into the slot machine and begins play of the slot machine. The slot machine begins to monitor John's playing session for the occurrence of one of a plurality of predetermined offer criteria that are stored in the slot machine's memory. One of the stored offer criteria is a decrease of the player's balance to below $3.00, which is the maximum wager amount for this slot machine. After John has played for some time, the slot machine determines that John's balance has decreased to $2.00, which is below the $3.00 threshold. Accordingly, the slot machine communicates with the slot server to signal the occurrence of this predetermined offer criterion. The slot server retrieves an offer that corresponds to this offer criterion and communicates the offer to the slot machine. The slot machine outputs the offer to John: "John, if you agree to view an advertisement from American Express™ and answer three questions about it, we'll add nine credits to your credit meter. That's enough for three chances to win the top jackpot!". John accepts the offer, listens to the advertisement, answers the questions (thus fulfilling his obligation) and nine credits are accordingly added to his credit meter. While using those nine credits John ends up winning a $40 payout. Several weeks later, partly due to learning more about American Express™ charge cards through the advertisement, John applies for an American Express™ card.

2. Description of System

Figure 2A:
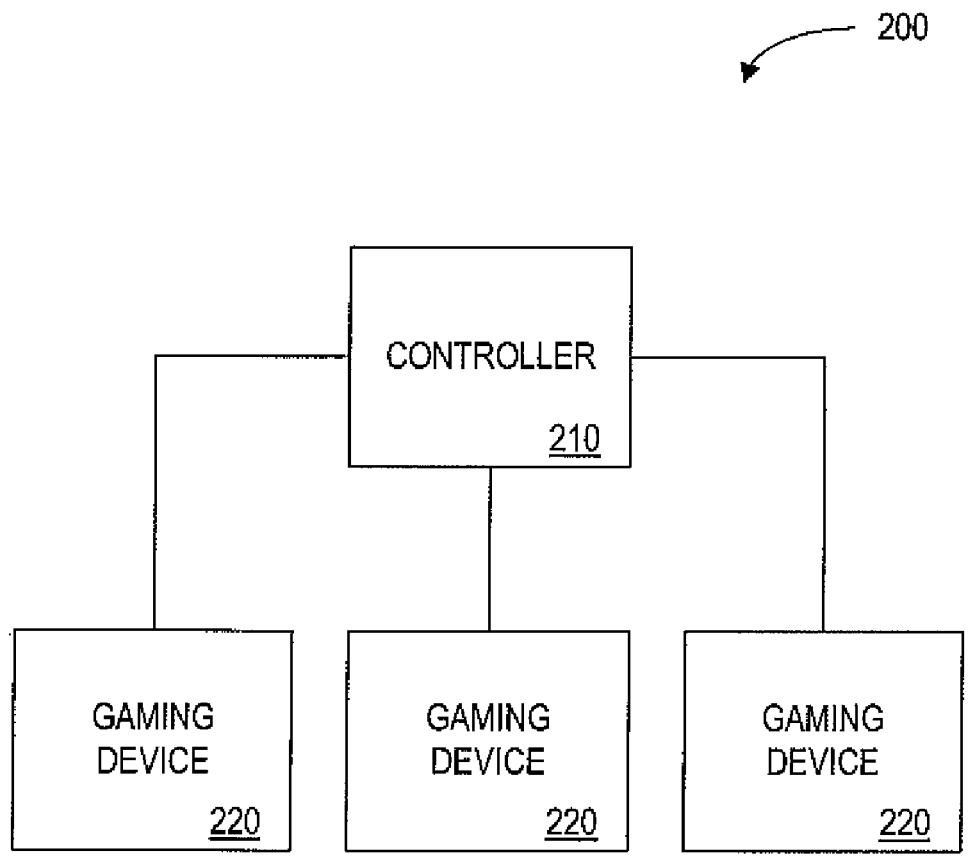
FIG. 2A is a block diagram of an embodiment of a system consistent with the present invention.

Referring now to FIG. 2A, a system 200 according to an embodiment of the present invention includes a controller 210 that is in communication with (wired and/or wirelessly) one or more gaming devices 220 via a network such as an intranet, the Internet, via another network protocol, or via other means for communication as would be understood by those of ordinary skill in the art. Although only three gaming devices 220 are depicted in FIG. 2A, any number of gaming devices may be in communication with the controller 210. The controller 210 and/or gaming devices 220 may comprise one or more computing devices, such as those based on the Intel® Pentium® processor.

In operation, the controller 210 may function under the control of a merchant or other entity that may also control the gaming devices 220. For example, the controller 210 may be a slot server in a casino's gaming device network. In some embodiments, some or all of the functions described herein as being performed by the controller 210 may be performed by any or all of the gaming devices 220. Similarly, in some embodiments of the present invention, some or all of the functions described herein as being performed by one or more of the gaming devices 220 may be performed by controller 210.

Referring now to FIG. 2A, a system 200 according to another embodiment of the present invention includes a primary controller 260 that is in communication with (wired and/or wirelessly) a secondary controller 270 and a secondary controller 280. Although only two secondary controllers are illustrated in FIG. 2A it should be understood that any number of secondary controllers may be used. Secondary controller 270 is in communication with gaming devices 275. Secondary controller 280 is in communication with gaming devices 285. It should be understood that secondary controller 270 and secondary controller 280 may be in communication with any number of gaming devices. Each of the devices of FIG. 2A are in communication with one another via a network such as an intranet, the Internet, via another network protocol, or via other means for communication as would be understood by those of ordinary skill in the art.

In some embodiments, some or all of the functions described herein as being performed by the primary controller 260 may be performed by either or both of the secondary controllers 270 and 280. Similarly, in some embodiments of the present invention, some or all of the functions described herein as being performed by one or more of the secondary controllers 270 and 280 may be performed by the primary controller 260.

Figure 2B:
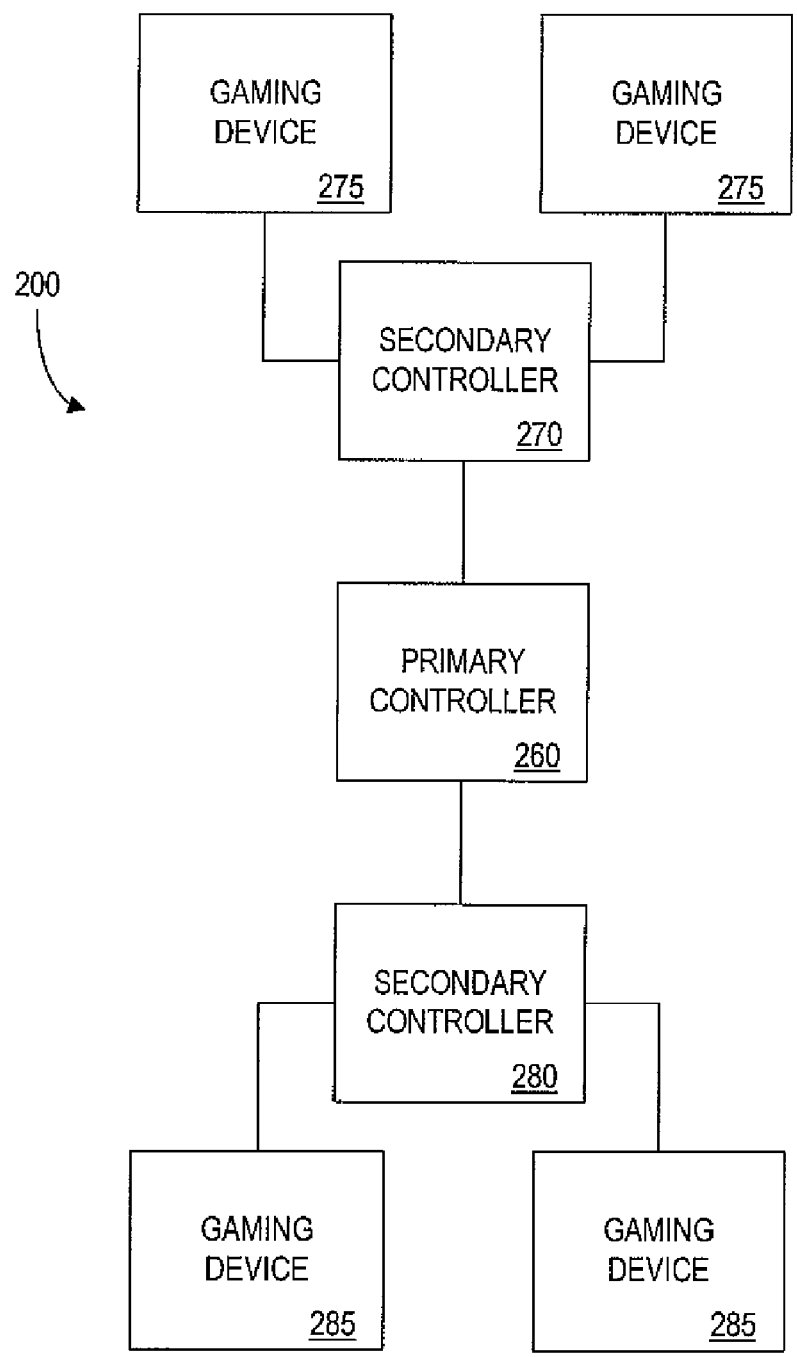
FIG. 2B is a block diagram of another embodiment of a system consistent with the present invention.

A difference between the two alternative embodiments depicted in FIGS. 2A and 2B is that the embodiment of FIG. 2B includes the primary controller 260 being in communication with secondary controller 270 and secondary controller 280 rather than being in communication with any of the gaming devices. Of course in other embodiments the primary controller may be in communication with any or all of the gaming devices 275 and 285 in addition to being in communication with secondary controller 270 and secondary controller 280. Primary controller 260 may be operable by an entity both distinct and physically remote from the entity operating the secondary controller 270 and secondary controller 280. The primary controller 260 may perform the methods of the present invention by sending signals to the secondary controller 270 and secondary controller 280 to be relayed to the gaming devices 275 and the gaming devices 285, respectively. For example, a gaming device manufacturer or a subsidizing entity may operate a primary controller 260 that communicates with a slot server (functioning as a secondary controller 270 and/or secondary controller 280) to provide a player playing a slot machine (functioning as any of the gaming devices 275 and/or gaming devices 285) one or more benefits in exchange for the player's commitment to an obligation. In one embodiment of the system illustrated in FIG. 2A, the functions of the primary controller 260 are consolidated into the controller 210. In some embodiments, the secondary controller 270 and secondary controller 280 may each be controlled by different casinos or by different locations of the same casino chain.

Referring now to both FIG. 2A and FIG. 2B, communication with the controller 210, the primary controller 260, and/or either of the secondary controllers 270 and 280 may be direct or indirect. For example, communication may be via a wired or wireless intranet, the Internet through a Web site maintained by controller 210, the primary controller 260, and/or either of the secondary controllers 270 and 280, on a remote server or via an on-line data network including commercial on-line service providers, bulletin board systems and the like. In some embodiments, the gaming devices 220 may communicate with controller 210 (and the gaming devices 275 and 285 may communicate with secondary controller 270 and 280, respectively) over radio frequency ("RF"), infrared ("IR"), cable TV, satellite links and the like, including combinations thereof.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

The controller 210, the primary controller 260, and/or either of the secondary controllers 270 and 280 may function as a "Web server" that generates Web pages (documents on the Web that typically include an HTML file and associated graphics and script files). Such Web pages may be accessed via the Web and allow communication with the controller 210, the primary controller 260, and/or either of the secondary controllers 270 and 280 in a manner known in the art. The controller 210, the primary controller 260, and/or either of the secondary controllers 270 and 280 may function in such a capacity, for example, in embodiments wherein the casino comprises an online virtual casino. Those of skill in the art will understand that there are a variety of well-known ways for creating and operating Web pages, and accordingly a detailed description of such known processes is omitted here for clarity.

Any or all of the controller 210, the primary controller 260, and/or either of the secondary controllers 270 and 280 and the gaming devices 220, 275, and 285 may comprise, e.g., a conventional personal computer, a portable type of computer, such as a laptop computer, a palm-top computer, a hand-held computer, or a Personal Digital Assistant (PDA), or combinations thereof.

In operation, the gaming devices 220, 275 and 285 may exchange information about a player with the controller 210, the primary controller 260, and/or the secondary controllers 270 and 280. The gaming devices 220, 275, and 285 may also exchange information about an offer provided to or accepted by a player with the controller 210, primary controller 260, and/or secondary controllers 270 and 280. The controller 210, the primary controller 260, and/or the secondary controllers 270 and 280 may for example, provide rules related to offering benefits or other information to the gaming devices 220, 275 and 285. The gaming devices 220, 275, and 285 may, for example, provide player obligation information and/or play session information to the controller 210, the primary controller 260, and/or the secondary controllers 270 and 280. The secondary controllers 270 and 280 may provide information about accepted offers to the primary controller 260 and also control signals to the gaming devices 220, 275, and 285 directing them to output benefits to players. In some embodiments, the offer is not an integrated part of a game the player is playing at the gaming device.

Support for this amendment is found in, inter alia, originally filed claim 31 of U.S. Application Ser. No. 10/121,243, to which the present application claims priority.

Figure 3:
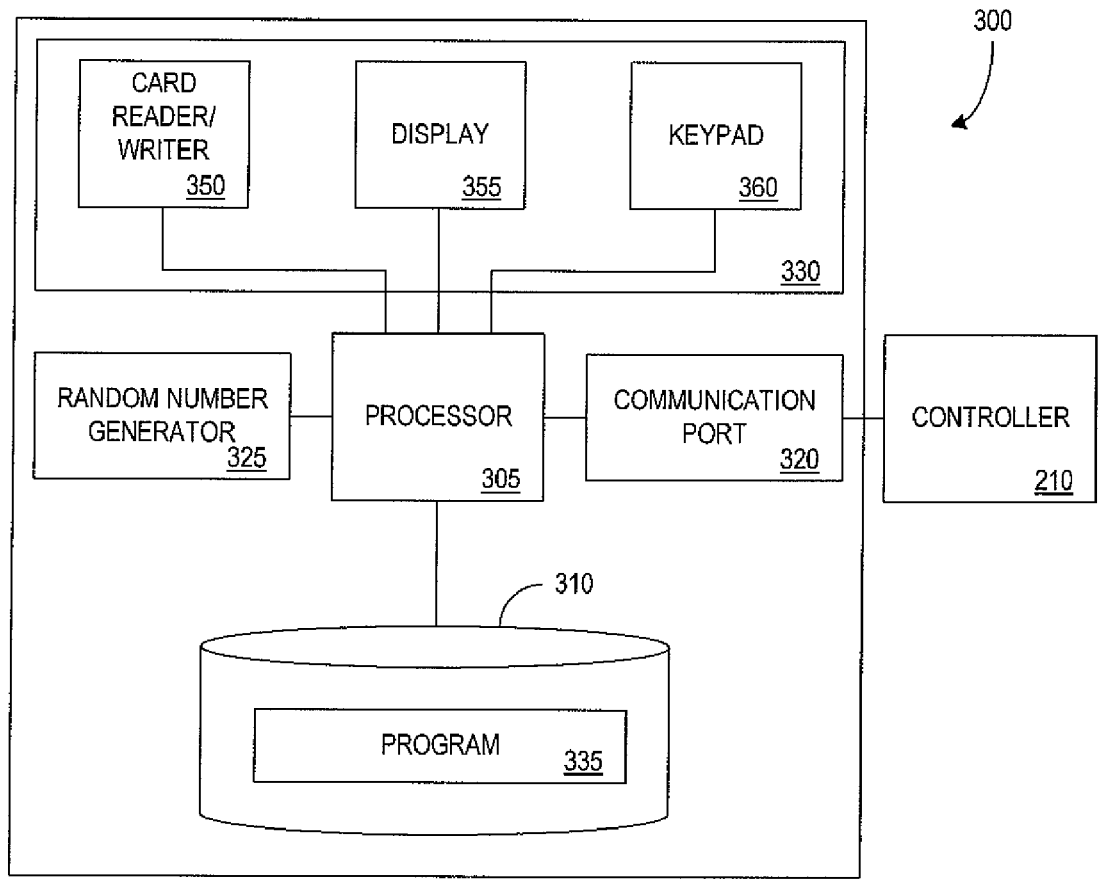
FIG. 3 is a block diagram of one embodiment of a gaming device.

Referring now to FIG. 3, depicted therein is a block diagram illustrating details of an example of gaming device 300. Gaming device 300 may be any and all of gaming devices 220, 275 and 285. A gaming device may comprise any gaming machine wherein a player obtains a game result in exchange for a monetary or other consideration. A gaming device may comprise, for example, including slot machines, video poker machines, video bingo machines, video keno machines, video blackjack machines, etc. that is capable of dispensing value in the form of cash and/or gambling tokens. Gaming devices may or may not be owned by a casino and/or may or may not be located within a brick-and-mortar casino. For example, in an embodiment wherein a casino comprises a virtual online casino or software which simulates a virtual casino, gaming device 300 may comprise a personal computer or other computing device operable to run a program that simulates the functions of the components of a gaming device as described herein.

For illustrative purposes, FIG. 3 depicts an example of a gaming device that comprises a slot machine or a video poker machine. As would be understood by one skilled in the art, if other gaming devices are used additional or substitute components may be included in gaming device 300. The gaming device 300 includes known hardware components, such as a processor 305 which may be any commonly available microprocessing chip such as the microprocessors manufactured by Intel, and marketed under the trademark "Pentium". Processor 305 is shown as being in communication with each of (i) a data storage device 310, (ii) an output device 315, (iii) a communications port 320, (iv) a random number generator 325, and (v) a player input/output device 330. Processor 305 can be in communication with the data storage device 310, output device 315, communications port 320, random number generator 325 and customer input device 330, for example, by means of a shared data bus or by dedicated connections, as is well known in the art. Furthermore, processor 305 may be embodied as a single processor or a number of processors. Gaming device 300 may comprise additional conventional components such as, for example, RAM, ROM, a hopper and hopper controller, a payment system module, and a starting controller.

The processor 305 may include or be coupled to one or more clocks or timers (not pictured), which may be useful for determining information relating to, for example, whether an obligation is fulfilled within a specified time. The processor 305 may also include or be in communication with one or more communication ports 320 through which the processor 305 communicates with other devices controller 210, primary controller 260, and/or secondary controllers 270 and 280. The processor 305 is also in communication with a data storage device 310. The data storage device 310 includes an appropriate combination of magnetic, optical and/or semiconductor memory, and may include, for example, additional processors, communication ports, Random Access Memory ("RAM"), Read-Only Memory ("ROM"), a compact disc and/or a hard disk. The processor 305 and the storage device 310 may each be, for example: (i) located entirely within a single computer or other computing device; or (ii) connected to each other by a remote communication medium, such as a serial port cable, a LAN, a telephone line, radio frequency transceiver, a fiber optic connection or the like. In some embodiments for example, the gaming device 300 may comprise one or more computers (or processors 305) that are connected to a remote server computer operative to maintain databases, where the data storage device 310 is comprised of the combination of the remote server computer and the associated databases.

The data storage device 310 stores a program 335 for controlling the processor 305. The processor 305 performs instructions of the program 335, and thereby operates in accordance with the present invention, and particularly in accordance with the methods described in detail herein. The present invention can be embodied as a computer program developed using an object oriented language that allows the modeling of complex systems with modular objects to create abstractions that are representative of real world, physical objects and their interrelationships. However, it would be understood by one of ordinary skill in the art that the invention as described herein can be implemented in many different ways using a wide range of programming techniques as well as general purpose hardware systems or dedicated controllers. The program 335 may be stored in a compressed, uncompiled and/or encrypted format. The program 335 furthermore may include program elements that may be generally useful, such as an operating system, a database management system and "device drivers" for allowing the processor 305 to interface with computer peripheral devices. Appropriate general purpose program elements are known to those skilled in the art, and need not be described in detail herein.

According to some embodiments of the present invention, the instructions of the program 335 may be read into a main memory of the processor 305 from another computer-readable medium, such from a ROM to a RAM. Execution of sequences of the instructions in the program 335 causes processor 305 to perform the process steps described herein. In alternative embodiments, hard-wired circuitry or integrated circuits may be used in place of, or in combination with, software instructions for implementation of the processes of the present invention. Thus, embodiments of the present invention are not limited to any specific combination of hardware, firmware, and/or software. In addition to the program 335, the storage device 310 may also be operative to store a payout table and a probability table.

Communications port 320 may be any input/output port commonly used for computer communications, such as a modem or other data transfer device. The communications port 320 enables the gaming device 300 to communicate with another device such as, for example, controller 210. It is also contemplated that the gaming device 300 may be in communication with other devices via the communications port 320. Among other functions, the communications port 320, under the control of the processor 305, may transmit data such as player tracking information received through the player input/output device 330, described below. The communications port 320 may also receive and/or transmit data relevant to providing an offer to a player that is interacting with the gaming device 300. The communications port 320 may include multiple communication channels for simultaneous connections with a plurality of external devices.

The input/output device 330 includes a card reader/writer 350 for reading player identification information stored, for example, on a player tracking card (not shown), which is preferably encoded with information to identify the player, in a known manner. The card reader/writer 350 may also be capable of writing data to a player tracking card. The player input/output device 330 may also include a display 355, having an associated player interface, such as a numeric keypad 360 for entry of player information (e.g. a security phrase utilized to confirm that the player at the gaming device corresponds to the player associated with a player tracking card inserted into the gaming device). The player input/output device 330 may be embodied, for example, as the Mastercom® device, commercially available from Bally Manufacturing®. Tracking individual players may be useful in rewarding players for participating in or causing particular events and/or in motivating players to participate in or cause such events.

Random number generator 325 may be, for example, an electronic pseudo-random number generator, as known to those who are skilled in the art, which determines a random number from a random electrical event or combination of events. Processor 305 may initiate the random number generator 325 to generate a random number and transmit such number to processor 305 once the processor 305 detects that a player has initiated a round of play on the gaming device (e.g. once the processor 305 detects that a player has pulled the handle of a slot machine). The processor 305 may then look up the generated random number in an appropriate field of a probability table, and retrieve the corresponding reel combination, or an individual game result for display to a player. The processor 305 may further consult a payout table to determine what, if any, payout corresponds to the game result. If a payout is due, then an appropriate number of credits may be added to a credit meter (not shown) of gaming device 300.

The output device 315 may comprise any device capable of providing information and/or a benefit to a player (it should be noted that in some embodiments of the present invention a benefit may comprise information). An output device may communicate with or be part of another device (e.g. a benefit dispensing device). Possible output devices include: a cathode ray tube (CRT) monitor, liquid crystal display (LCD) screen, light emitting diode (LED) screen, a printer, an audio speaker, an infra-red transmitter, and a radio transmitter. In embodiments wherein the output device 315 also functions as a benefit dispensing device, the output device 315 may comprise any device capable of providing a benefit such as: dispensing money and/or casino tokens; dispensing a product of value (e.g. a ticket to a show in a casino); printing a confirmation of a benefit (e.g. a receipt confirming reservations at a casino hotel or restaurant); and/or printing or otherwise outputting cashless gaming receipts. In some embodiments output device 315 may comprise a printing device capable of printing a written agreement describing an offer that a player was presented with and/or accepted. It should be noted that although output device 315 is depicted as a component of gaming device 300, in some embodiments output device 315 may comprise an output device that is external to the gaming device 300 (e.g. located near gaming device 300).

Figure 4:
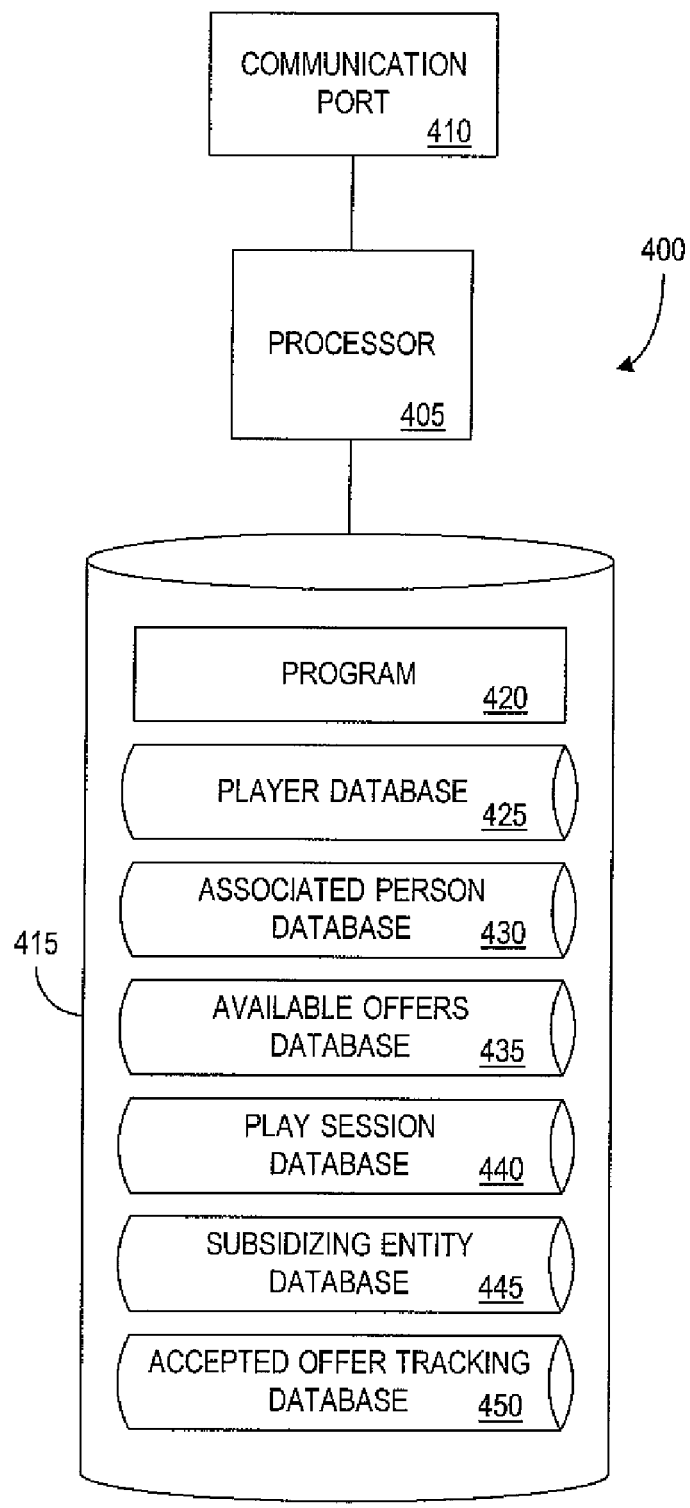
FIG. 4 is a block diagram of one embodiment of a controller.

Referring now to FIG. 4, depicted therein is a block diagram illustrating details of an example of a controller 400. Controller 400 may be controller 210 of FIG. 2A, and/or the primary controller 260 and the secondary controllers 270 and 280 of FIG. 2B. The controller 400 is operative to manage the system and execute the methods of the present invention. The controller 400 may be implemented as one or more system controllers, one or more dedicated hardware circuits, one or more appropriately programmed general purpose computers, or any other similar electronic, mechanical, electromechanical, and/or human operated device.

The controller 400 may include a processor 405, such as one or more Intel® Pentium® processors. The processor 405 may include or be coupled to one or more clocks or timers (not pictured), which may be useful for determining information relating to, for example, whether an obligation is fulfilled within a specified time. The processor 405 may also include or be in communication with and one or more communication ports 410 through which the processor 405 communicates with other devices such as the gaming devices 220, 275, and 285. The processor 405 is also in communication with a data storage device 415. The data storage device 415 includes an appropriate combination of magnetic, optical and/or semiconductor memory, and may include, for example, additional processors, communication ports, Random Access Memory ("RAM"), Read-Only Memory ("ROM"), a compact disc and/or a hard disk. The processor 405 and the storage device 415 may each be, for example: (i) located entirely within a single computer or other computing device; or (ii) connected to each other by a remote communication medium, such as a serial port cable, a LAN, a telephone line, radio frequency transceiver, a fiber optic connection or the like. In some embodiments for example, the controller 400 may comprise one or more computers (or processors 405) that are connected to a remote server computer operative to maintain databases, where the data storage device 415 is comprised of the combination of the remote server computer and the associated databases.

The data storage device 415 stores a program 420 for controlling the processor 405. The processor 405 performs instructions of the program 420, and thereby operates in accordance with the present invention, and particularly in accordance with the methods described in detail herein. The present invention can be embodied as a computer program developed using an object oriented language that allows the modeling of complex systems with modular objects to create abstractions that are representative of real world, physical objects and their interrelationships. However, it would be understood by one of ordinary skill in the art that the invention as described herein can be implemented in many different ways using a wide range of programming techniques as well as general purpose hardware systems or dedicated controllers. The program 420 may be stored in a compressed, uncompiled and/or encrypted format. The program 420 furthermore may include program elements that may be generally useful, such as an operating system, a database management system and "device drivers" for allowing the processor 405 to interface with computer peripheral devices. Appropriate general purpose program elements are known to those skilled in the art, and need not be described in detail herein.

Further, the program 420 is operative to execute a number of invention-specific modules or subroutines including but not limited to one or more routines to identify a player at a gaming device as a potential candidate to be provided with an offer; one or more routines to receive information about a player; one or more routines to provide an offer or cause an offer to be provided to a player; one or more routines to determine if a player accepts an offer; one or more routines to signal gaming devices 220, 275 and/or 285 to output a benefit to a player; one or more routines to verify a player's fulfillment of an obligation that was the subject of an offer which the player accepted; one or more routines to impose a consequence upon a player who fails to fulfill an obligation; and one or more routines to control databases or software objects that track information regarding, for example, players, subsidizing entities, persons associated with players, gaming devices 220, 275 and 285, offers, and fulfillment of obligations. Examples of these routines and their operation are described in detail below in conjunction with the flow diagrams.

According to some embodiments of the present invention, the instructions of the program 420 may be read into a main memory of the processor 405 from another computer-readable medium, such from a ROM to a RAM. Execution of sequences of the instructions in the program 420 causes processor 405 to perform the process steps described herein. In alternative embodiments, hard-wired circuitry or integrated circuits may be used in place of, or in combination with, software instructions for implementation of the processes of the present invention. Thus, embodiments of the present invention are not limited to any specific combination of hardware, firmware, and/or software.

In addition to the program 420, the storage device 415 is also operative to store (i) a player database 425, (ii) an associated person database 430, (iii) an available offers database 435, (iv) a play session database 440, (v) a subsidizing entity database 445, and (vi) an accepted offer tracking database 450. The databases 425, 430, 435, 440, 445, and 450 are described in detail below and example structures are depicted with sample entries in the accompanying figures. As will be understood by those skilled in the art, the schematic illustrations and accompanying descriptions of the sample databases presented herein are exemplary arrangements for stored representations of information. Any number of other arrangements may be employed besides those suggested by the tables shown. For example, even though six separate databases are illustrated, the invention could be practiced effectively using one, two, three, four, five, seven, or more functionally equivalent databases. Similarly, the illustrated entries of the databases represent exemplary information only; those skilled in the art will understand that the number and content of the entries can be different from those illustrated herein. Further, despite the depiction of the databases as tables, an object based model could be used to store and manipulate the data types of the present invention and likewise, object methods or behaviors can be used to implement the processes of the present invention. These processes are described below in detail with respect to the flow diagrams.

3. Description of Databases

Player Database

Referring to FIG. 5, a table represents the player database 425 that may be stored at the controller 210, primary controller 260 or one or more of the secondary controllers 270 and 280 according to some embodiments of the present invention. According to another embodiment, some or all of the information in the player database 425 may be stored at one or more of the gaming devices 220, 275, and 285 instead. According to yet another embodiment, some or all of the information in the player database may be stored on each individual player's player tracking card. The table includes entries identifying players who may operate a gaming device in a casino. The table defines fields 502, 504, 506, 508, 510, 512, 512, 514, 516, 518, and 520 for each of the entries. The fields specify: a player identifier 502; a player name 504; a financial account identifier 506; an associated person identifier 508; a security phrase 510; demographic information 512; theoretical win 514; actual win/[loss] 516; comp points 518; and average wager amount 520.

The information in the player database 425 may be created and updated, for example, based on information received from a player. For example, the information may be created when a player registers with a casino and receives a player tracking card encoded with the player identifier. The information may be subsequently updated when a player requests to update the information (e.g. when a player indicates a desire to add an associated person) or when additional information is obtained about the player via the casino's interactions with the player (e.g. the lifetime theoretical win may be updated on an ongoing basis as the player plays games at a casino).

The player identifier 502 may be, for example, an alphanumeric code associated with a player who may operate a gaming device or play a table game at a casino. The player identifier 502 may be generated or selected, for example, by the controller 210 or by the player (e.g., when a player first registers with a casino). For each player, the player database 425 may also store the player's name 504 (e.g., for use in presenting offers to the player).

The player database 425 also stores a financial account identifier 506 (e.g., a credit card account number, a debit card account number, a checking account number, or digital payment protocol information) associated with the player. The financial account identifier 506 may be used, for example, to credit a payment to the player (e.g. wherein a benefit offered to the player comprises a monetary amount) and/or to apply a penalty to a player if he or she does not satisfy an obligation defined by an offer accepted by the player. The financial account identifier 506 may also be used to charge a monetary amount to the account wherein the monetary amount is based on a value of a benefit provided, in an embodiment where the player is provided the benefit before satisfying an obligation and subsequently does not satisfy the obligation.

The player database 425 also stores an associated person identifier 508 (e.g., an alphanumeric string of digits) that identifies a person designated by the corresponding player as a person that may receive a benefit defined by an offer accepted by the player. In some embodiments of the present invention a person other than the player that accepts an offer may be provided with the benefit defined by the offer. In such embodiments the benefit defined by an offer that is accepted by the player is provided to the associated person rather than to the player. The benefit may be provided, for example, before or after the player satisfies the obligation defined by the offer corresponding to the benefit. The associated person identifier 508 may be generated or selected by, e.g. the controller 210, and/or the player. The associated person identifier 508 may comprise, for example, a name or social security number of the associated person. It should be noted that more than one associated person may be designated by a player. Embodiments wherein the player may designate one or more associated persons to received benefits is discussed in more detail below, with respect to FIG. 6 (associated persons database 430).

The player database 425 also stores a security phrase 510. The security phrase 510 may be generated or selected by, e.g., the controller 210, and/or the player. The security phrase may be used, e.g., to verify that the player operating a gaming device and being presented with an offer is the player associated with the player identifier and player tracking card inserted into the gaming device. Verifying a player's identity before allowing a player to accept an offer may be particularly important in embodiments where an offer identifies a penalty that is to be applied to the financial account associated with the player identifier of a player tracking card inserted into the gaming device.

For example, a situation may occur where a player inserts his player tracking card into a gaming device and subsequently walks away from the gaming device while forgetting to remove the player tracking card. In this example a subsequent player may begin operating the gaming device without realizing that another player's player tracking card is inserted into the gaming device. The subsequent player may be presented with an offer (e.g., where the offer is selected based on information corresponding to the player identifier of the player tracking card still inserted into the gaming device as stored in the player database 425). In accordance with some embodiments a player need only indicate an acceptance of the offer at the gaming device without providing additional information to the gaming device. In such embodiments the accepted offer may be stored in the accepted offers tracking database 450 (described in detail below with respect to FIG. 10) in associated with information about the player retrieved from the player database 425 based on the player identifier. In such embodiments, the acceptance by the subsequent player of an offer may result in the acceptance of the offer being stored in the accepted offers database 450 in association with the player identifier of the previous player that had left the player tracking card in the gaming device. Thus, if the subsequent player does not fulfill the obligation defined by the accepted offer and there is a penalty defined by the offer, the penalty may be applied to the financial account identifier associated with the previous player even though the previous player was not the one that accepted the offer. To prevent such an inequitable result, a player accepting an offer may be required to confirm his identity (i.e., confirm that he is the person corresponding to the player identifier of the player tracking card inserted into the gaming device). In other embodiments, a player may be required to confirm his identity (i) periodically while operating a gaming device, (ii) once the gaming device detects a pause of a predetermined duration in the operation of the gaming device, and/or (iii) before an offer is presented to the player.

A gaming device may attempt to verify the identity of a player operating a gaming device by various means. For example, as illustrated in FIG. 6, a security phrase 510 may be associated with a player identifier. A player may be prompted to enter or verify the security phrase. Such a prompt may comprise a visual and/or audio prompt. The player may be prompted to enter (e.g., type in using a keypad or touchscreen or speak into a microphone associated with the gaming device) the security phrase. Alternatively the player may be presented with a plurality of phrases and prompted to select which of the plurality of phrases is the security phrase associated with the player identifier. In yet another alternative embodiment a "hint question" may be associated with the player identifier in addition to the security phrase. The hint question may be presented to the player and the player prompted to enter the security phrase in response to the hint question.

The security phrase may comprise, e.g. one or more strings of alphanumeric digits or an image. The security phrase may be generated or selected by, e.g. the controller 210 when the player first registers with a casino. In another embodiment the player may select the security phrase. For example, the player may be requested to select a security phrase that is easy for the player to remember (e.g., a pet's name). A player may be asked to provide a certain type of specified information for use as a security phrase (e.g., the player's social security number). In embodiments wherein the security phrase comprises an image, the image may be a photograph of the player's face. In such an embodiment the verification of the player's identity at a gaming device may comprise capturing a video image of the player operating the gaming device and comparing it to the stored photograph associated with the player identifier of the player tracking card inserted into the gaming device. Such a comparison could be performed, for example, by use of photograph comparison software. Other biometric identifiers other than facial feature may also be used to verify a player's identity. For example, a unique physiological trait or behavioral characteristic such as a fingerprint, retina scan, or signature may be requested of the player accepting an offer and compared to one stored in association with a player identifier of a player tracking card inserted into a gaming device.

In other embodiments of the present invention an alternate method of verifying that the player accepting an offer is the player associated with the player identifier inserted into the gaming device is the same person. A photograph or other video image of the player that is accepting or being presented with an offer may be obtained at the time of acceptance of the offer. For example, a camera may be a component of or associated with a gaming device. In such an embodiment the gaming device or a controller directing the gaming device may cause the camera to capture a video image of the player. In another embodiment one of the multitude of security cameras prominently covering the casino floor in most casinos may be directed to capture a video image of a player operating a specified gaming device at which an offer is being accepted. The captured video image may be stored in association with an indication of the accepted offer in the accepted offers database 450 (described in detail below with respect to FIG. 9). The captured video image may be retrieved for use in resolving a dispute if, subsequent to the acceptance of the offer, the player associated with the player identifier stored in association with the accepted offer denies having accepted the offer.

The demographic information 512 may store demographic information that is useful for targeting offers to a player of a gaming device. In one embodiment a subsidy provider may specify one or more player-related prerequisites to be satisfied before a particular offer may be provided to a player at a gaming device. For example, a subsidy provider may specify that the offer be provided only to female players or to players within a certain age group. In this example, when determining whether to provide a player at a gaming device with the subsidizing party's offer, the demographic information field 512 may be accessed, based on the player identifier of the player at the gaming device, to determine whether the demographic information satisfies the subsidy provider's prerequisites. Of course a subsidy provider may specify other player-related prerequisites in addition to or instead of demographic information. Such player-related prerequisites are discussed in detail with respect to the available offers database 435 (FIG. 7). Further, an entity other than a subsidy provider may specify player-related prerequisites that are to be satisfied before an offer is provided to a player. For example, in an embodiment where the casino is not the subsidy provider the casino may specify player-related prerequisites in addition to or instead of any specified by the subsidy provider.

The theoretical win 514 stores an indication of the theoretical win of the player based on the playing activity of the player since the playing activity of the player has been tracked. In other words, the theoretical win 514 may be a "lifetime" theoretical win. In other embodiments a theoretical win based on other periods of time may be stored in addition to or instead of the lifetime theoretical win. For example, an annual theoretical win may be stored. The actual win/[loss] 516 stores an indication of the actual dollar amount that the corresponding player has won or lost while gambling at the casino. A loss is indicated in brackets in the table of FIG. 5.

The comp points 518 stores an indication of the amount of comp points that a player is currently entitled to. Comp point programs are a common method for a casino to reward players by awarding points to players as a reward for certain gambling behavior that a casino finds desirable. Although the comp points programs differ from casino to casino, in a typical comp point program a player accumulates comp points based on (i) the length of time or a number of game plays at a gaming device or table game; (ii) the average wager of a player; and/or (iii) for playing a particular gaming device or a group of gaming devices. As the player accumulates comp points the player may exchange some or all of the comp points for goods or services specified by the comp point program. For example, a player may exchange 1000 comp points for a dinner at a casino restaurant. As the player exchanges comp points for a good or service the exchanged comp points are deducted from the player's comp point balance reflected in field 518 of table 425. In some comp point programs the rewards are defined in terms of dollar amounts rather than points. In yet other comp point programs the points are exchangeable into dollar amounts based on a schedule defined by the casino, allowing the player to convert the accumulated points into dollar amounts and then use the dollar amounts to purchase goods or services from the casino.

In some embodiments of the present invention an offer may require the player to give up a specified number of comp points in addition to committing to an obligation in order to obtain the benefit defined by the offer. In other embodiments a deduction of a specified number of comp points from the player's accumulated balance or a restriction on the player's use of accumulated comp points (e.g. player cannot use comp points for a specified period of time) may be a penalty defined by an offer.

The average wager 520 stores the amount of an average wager placed by the player. The average wager amount may be updated, e.g. each time the player makes a wager, or periodically (e.g. once per play session) based on the individual wagers placed by the player over the course of the period. The average wager 520 may include wagers placed while playing a gaming device, wagers placed while playing a table game, or a combination thereof. The average wager 520 may be the average wager amount of the player (i) since the player's wager amount began to be tracked; (ii) over the course of a given year; (iii) since the last offer provided to or accepted by the player; or (iv) any other period deemed relevant.

The information stored in theoretical win 514, the actual win/[loss] 516, the comp points 518, and the average wager 520 may each be used (individually or in combination) to target offers to players. For example, a subsidy provider may specify that a particular offer is only to be provided to a player with an average wager amount of at least $3.00. Alternatively a subsidy provider may specify that a particular offer is only to be provided to a player with an average wager amount of no more than $2.00 and whose actual win/[loss] 516 amount indicates a loss of at least $50.00. Such prerequisites based on these fields may be included as player-related specifications in the available offers database 435 (FIG. 7). Other information related to a player in addition to or instead of that illustrated in table 425 may be stored and used to target offers to players without departing from the spirit and scope of the present invention.

It should be understood that although a player identifier and information related to each registered player is described in detail with reference to providing offers to players, a player need not be registered in order to receive an offer in accordance with the present invention. For example, an offer may be provided to a player regardless of any information about the player that is known (e.g. the offer may not be targeted but may instead be provided to any player). In some embodiments an offer may be provided based on an event or condition at a gaming device. For example, an offer may be provided to a player based on a player's gambling behavior during a particular session at a gaming device. A session may be defined as a period of time from the time a player initiates play at a gaming device or table (e.g. by inserting a player tracking card or initiating a starting controller) to the time a player ends play at the gaming device (e.g. by removing the player tracking card, walking away from the gaming device, and/or pausing play for at least a predefined amount of time). In such embodiments no information about the player need be stored or registered ahead of time. The information necessary for determining whether to provide an offer may simply be accumulated by, e.g., controller 210 and/or gaming devices 220 as the player plays the gaming device. In yet other embodiments information about a player may be gathered (e.g., via a survey presented to the player at the gaming device) while the player is playing. In other words, in some embodiments of the present invention no pre-registration of a player or player-related information is necessary or preferred.

Associated Person Database

Referring to FIG. 6, a table represents the associated person database 430 that may be stored at the controller 210, primary controller 260 or one or more of the secondary controllers 270 and 280 according to some embodiments of the present invention. According to another embodiment, some or all of the information in the associated person database 430 may be stored on each individual player's player tracking card. The table includes entries identifying one or more persons associated with players who may operate a gaming device in a casino. The associated persons are persons that are designated by a player as persons to whom a benefit defined by an offer accepted by the player may be provided. The table defines fields 602, 604, 606, 608, and 610 for each of the entries. The fields specify: an associated person identifier 602; a name 604; contact information 606; a special date 608; and a special date description 610.

The information in the associated person database 430 may be created and updated, for example, based on information received from a player. For example, the information may be created when a player registers with a casino. The information may be subsequently updated when a player requests to update the information (e.g. when a player indicates a desire to add or remove an associated person) or when additional information is obtained from an associated person identified by one of the entries (e.g. when a request to be removed from the associated person database 430 or updated contact information is received from an associated person).

As described above, according to some embodiments of the present invention a player may designate a person other than the player to receive a benefit defined by an offer accepted by the player. Such a person is referred to as an associated person in the present invention. A player may designate such an associated person (i) while playing a gaming device or table game, or (ii) at another time. For example, a player may designate an associated person when the player first registers with a casino or at a time subsequent to registering with a casino by, e.g., informing an employee of the casino of the player's desire to designate the associated person. Alternatively, the player may be able to designate such a person by filling out a form (e.g., a paper document that is handed or mailed to an employee of the casino or an electronic form at a kiosk located in the casino). In some embodiments a player may designate an associated person while playing at a gaming device or table game. For example, when presented with an offer that defines a benefit the player may be presented with an option of obtaining the benefit for himself or for another person. If the player chooses the option of obtaining the benefit for another person the player may be requested to enter information to identify the person. In another embodiment a player may indicate a desire to designate an associated person while playing at a gaming device or at a table game without first being presented with an offer. For example, a player may select a "designate person to receive benefits" option on a menu of options on a gaming device.

It should be noted that an associated person need not be present in the casino when the player who designates the associated person as the person to receive a benefit is presented with an offer or accepts an offer. Further, the associated person need not be present in the casino in order to obtain the benefit. In fact, the associated person need not be affiliated with the casino in any manner beyond being an associated person designated by a player.

A particular associated person may or may not correspond to a particular benefit or accepted offer. In some embodiments a player may designate one or more associated persons to be associated with the player's player identifier. In such embodiments the player may specify which particular associated person is to be provided the benefit defined by a particular offer at the time the player accepts the offer. In other embodiments a player may input information designating an associated person as the person to be provided the benefit defined by an offer as the player is accepting the offer for purposes of that particular offer only. In embodiments where a player designates one or more associated persons without constraint to a particular offer the information the player provides regarding the one or more associated persons may be used to target or tailor offers to the player. Such an embodiment will be described with particular reference to table 430.

Returning now to table 430, the associated person identifier 602 may comprise any identifier that uniquely identifies an associated person. The associated person identifier may comprise, e.g. a string of alphanumeric digits and/or an image. The associated person identifier may be (i) provided by a player at the time the player designates the associated person; (ii) generated or selected by one of the controller 210, primary controller 260, one of the secondary controllers 270 and 280, and/or any of the gaming devices 220, 275 and 285; or (iii) provided by the associated person in embodiments where the associated person is contacted. For example, the associated person identifier may comprise a unique string of alphanumeric digits that is generated to uniquely identify the person or the associated person's social security number.

The name 604 stores the name of the associated person corresponding to the associated person identifier. The name may be (i) provided by the player designating the associated person; (ii) provided by the associated person; or (iii) otherwise obtained by the casino. As illustrated by the names stored in table 430, the associated person need not be a natural person but may instead comprise a corporation, non-profit organization, or other entity. The name of the associated person may be retrieved and incorporated into the provision of an offer to the player who had designated the associated person. For example, assuming the associated person's name is "John Doe" a player may be provided with an offer that invites the player to commit to an obligation in order to earn the benefit defined by the offer for "John". The relationship of the associated person to the player may also be stored in table 430 (e.g., an indication that the associated person is the player's spouse, sibling, or friend may be stored). In such an embodiment the player may be provided with an offer that invites the player to earn the benefit "for your brother John". Personalizing an offer in such a manner may substantially increase the acceptance rate of the offer.

The contact information 606 stores an indication of how to contact the associated person. Contact information may comprise, e.g., a telephone number, electronic mail ("e-mail") address, or postal address. The contact information may be utilized to contact the associated person. The associated person may be contacted in a variety of circumstances in accordance with various embodiments of the present invention. In one embodiment the associated person may be contacted initially when a player first designates the person as a designated person. For example, the associated person's permission to be associated with the player as an associated person may be necessary or preferred. In another embodiment the associated person may be contacted when a player accepts an offer and specifies that the associated person is to be provided the benefit defined by the offer. For example, before finalizing that the associated person is to be provided with the benefit the associated person's acquiescence may be necessary or preferred. This may be preferred to avoid a situation in which the person feels uncomfortable as a result of the offer. In embodiments where the associated person is contacted when a player accepts an offer, the associated person may be informed of what the benefit is and/or the obligation the player committed to in exchange for the benefit.

In some embodiments the associated person may be provided with the benefit before the player satisfies the obligation. In such an embodiment the associated person may be informed of a penalty, if any, that may be imposed on the player and/or the associated person if the player subsequently fails to satisfy the obligation. For example, the associated person may be required to return the benefit or provide a value equivalent to the benefit if the player does not satisfy the obligation. In embodiments where the associated person is not provided the benefit until the player satisfies the obligation the associated person may be informed of the progress of the player towards satisfying the obligation. For example, assuming the obligation comprises playing at a gaming device for an hour, the associated person may be updated every fifteen minutes as to the player's progress towards satisfying the obligation (e.g. via e-mail messages transmitted to the player). In one embodiment the player and the associated person may be placed in contact while the player is attempting to satisfy the obligation (e.g. via a telephone or video connection) such that the associated person may encourage the player to satisfy the obligation. In another example, assuming the obligation comprises a commitment to visit a retailer or test a product before a predefined date, the associated person may be informed of the player's failure to satisfy the commitment as the predefined date approaches. In one embodiment the player may be provided with a message that the associated person will be informed of the player's failure to satisfy the obligation unless the player does satisfy the obligation. Such a message may be provided to the player (i) on or before the predefined date (e.g., to encourage the player to fulfill the obligation before the predefined date); and/or (ii) on or after the predefined date (e.g., to give the player one more chance to satisfy the obligation even though the predefined date has passed). A player may be motivated to satisfy an obligation upon receiving such a message to avoid having the associated person learn of the player's failure.

The special date 608 stores an indication of a date that is in some way associated with the associated person. Such a date may be (i) provided by the player; (ii) provided by the associated person; or (iii) otherwise obtained by a casino or other operator implementing the present invention. A special date may comprise, e.g. a birthday, anniversary, holiday or date of another event that may be utilized to target offers to a player. The special date description 610 stores a description of the significance of the special date. Although a textual description is illustrated in table 430, another method of describing the significance of the special date may be used. For example, the special date description 610 may comprise a code that is identified as corresponding to a specific type of event.

The special date 608 and special date description 610 may be utilized to (i) increase the acceptance rate of an offer by customizing the offer towards a particular player (e.g., a player may be more likely to accept an offer that incorporates people and dates relevant to the player's life); (ii) select one of a plurality of available offers to provide to the player (e.g., if there is a choice between an offer that defines a benefit of a dinner in the casino's restaurant on the night of the offer and another offer that defines a gift certificate to a popular merchant, the latter offer is an offer that is more appropriate if the benefit is to be provided to a person other than a player); and/or (iii) aid the determination of the most effective timing of the offer towards the player (e.g., the system may determine to provide a particular offer because the current date is within a predetermined time of a special date). For example, assuming it is determined that a special date corresponding to an associated player designated by a particular player is approaching (e.g., is within one month of the current date) an offer may be selected and/or customized to take advantage of this fact. In this example, if it is determined that a player had designated an associated person "John" with an associated special date of September 1 (the current date being August 2) and a special date description of "birthday", the system may output an offer to the player inviting the player to commit to a specified obligation in order to obtain a specified benefit for John because John's birthday was coming up in less than a month. If the benefit in the example is a gift certificate to a merchant, the player may accept the offer after being reminded that John's birthday is coming up and that the gift certificate might make a good gift for John. The player may view the offer as an opportunity to avoid an upcoming cost (i.e., the cost of buying John a birthday present), which may prove to be a powerful incentive. The casino or other operator implementing the methods of the present invention may also earn the player's goodwill in making such an offer by reminding him of an upcoming event and providing a suggestion for a present.

Further information relevant to an associated person, in addition to or instead of special date information, may be stored and used to increase the effectiveness of offers. Such further information may comprise, for example, information related to the associated person's interests, hobbies, and/or demographic profile. In some embodiments an associated person may be allowed to provide information to the system that may be used to customize and/or target offers to a player. A player may or may not be informed of such information provided by the associated person. For example, in one embodiment an associated person may access some or all of the available offers in the system of the present invention and provide an indication of which benefits the associated person is interested in (thus indicating which offers that define these benefits should be provided to the player). In one embodiment once a player designates an associated person the associated person may be allowed to indicate to the player which benefits the associated person is interested in by means of, e.g., a wish list stored in association with the associated person. When selecting offers to be presented to the player the system may access such a wish list and, e.g. select an offer based on the wish list.

It should be noted, as illustrated in table 430, that more than one special date may be associated with an associated person. It should also be noted that the system may use general special dates (e.g. such as Valentine's Day) to target offers. The system may also use demographic information related to a player and/or an associated person of the player to determine what general special dates are applicable to the player and/or associated person (e.g., a religious affiliation may be used to determine whether a benefit defined by an offer is to be characterized as a Christmas or Hanukkah gift).

Available Offers Database

Referring to FIG. 7, a table represents the available offers database 435 that may be stored at the controller 210, primary controller 260 or one or more of the secondary controllers 270 and 280 according to some embodiments of the present invention. According to another embodiment, some or all of the information in the available offers database 435 may be stored at one or more of the gaming devices 220, 275, and 285 instead. The table includes entries identifying offers that are available for presentation to players who may be operating a gaming device or playing a table game in a casino. The table defines fields 700, 702, 704, 706, 708, 710, and 712 for each of the entries. The fields specify: an offer identifier 702; a benefit 704; an obligation 706; a player prerequisite 708; a subsidizing entity identifier 710; offer criterion 712; and a penalty 714.

The information in the available offers database 435 may be created and updated, for example, based on information received from a subsidizing entity. For example, an offer identifier may be generated and a record storing the information corresponding to the generated offer identifier may be stored in the available offers database 435 when a subsidizing entity transmits the information to the casino. The information may be subsequently updated, for example, based on a request from the subsidizing entity and/or based on information obtained once the offer is presented to one or more players (e.g., the value of a benefit may be increased if an acceptance rate of a particular offer is not sufficiently high).

The offer identifier 700 may comprise, e.g. an alphanumeric string of digits that uniquely identifies an offer. The offer identifier may be generated or selected (e.g., from a list of previously generated identifiers) when an offer is first entered into the system of the present invention.

The benefit 702 stores an indication of the benefit to be provided if a player accepts the offer. A benefit is anything (e.g., a good or service) provided in exchange for the player's commitment to an obligation defined by the offer. As described above, a benefit may be provided to a player or a person other than the player. A benefit may be provided at the time the player commits to the obligation (e.g. when the player accepts the offer) or at another time (e.g., after the player satisfies the obligation corresponding to the benefit). In some embodiments the benefit may be divisible temporally such that a portion of the benefit may be provided at the time of the player's commitment and another portion of the benefit may be provided at the time the player satisfies the obligation. In some embodiments the benefit may be provided in multiple portions as the player progresses towards satisfying the obligation. A benefit may also be divisible among more than one beneficiary. For example, a portion of a benefit may be provided to the player and another portion to an associated person designated by the player. In another example a benefit may be provided to two or more associated persons. In yet another embodiment a particular offer may define more than one benefit. In such an embodiment each of the defined benefits may be provided to the same person or to different persons.

Examples of benefits include but are not limited to (i) a monetary amount (e.g., U.S. dollars, casino coins, cashless gaming receipts, credits added to a player's credit balance, or a gift certificate to a retailer or restaurant); (ii) a product or service (e.g., a piece of jewelry, a gadget, a magazine subscription, dinner at a restaurant, a carwash, a manicure); (iv) discounts on products or services (e.g. 20% off a television, dinner for two for the price of one); (v) alternate currencies (e.g., a specified number of comp points or frequent flier miles); (vi) an entry into a game of chance (e.g., a lottery ticket or an entry into a sweepstakes); and (vii) an adjustment in the operation of a gaming device (e.g., a more favorable probability table, higher available payout amounts, lower maximum wager amount). A benefit may be customized based on information about the player to whom the offer is to be provided. For example, assuming the benefit defined by an offer is a gift certificate to a restaurant or retailer, the actual restaurant or retailer identified in the offer may be determined based on the home address of the player or associated person that is to be provided the benefit.

A benefit may be defined, e.g., at the time the offer to which the benefit corresponds is entered into the available offers database 435. In another embodiment the benefit may be defined on an ad hoc basis based on, for example, revenue management considerations of the casino or other subsidizing entity providing the offer. For example, a casino may determine that there is a surplus of hotel rooms available for the current night in the hotel associated with the casino. The casino may thus define a benefit of an offer as a free night's stay (for the current night) in the hotel room. In another example a subsidizing entity such as a retailer may determine that a product is not selling at an acceptable rate. The retailer may thus define a benefit of an offer provided by the retailer as a free unit of the product or a discount on the product.

The benefit may be provided to a player or associated person designated by the player by (i) the casino, (ii) a subsidizing entity other than the casino, (iii) another entity, or (iv) a combination thereof. For example, assume the subsidizing entity of an offer is credit card issuer and the benefit comprises a monetary amount to be provided to the player at the time of acceptance of the offer in the form of coins being dropped into the coin tray of the gaming device the player is playing. In such an example the casino may provide the benefit to the player even though the casino is not the subsidizing entity. In embodiments where the benefit is provided to a player by an entity other than the subsidizing entity, the entity that provided the benefit may be subsequently reimbursed for the value of the benefit by the subsidizing entity. For example, in the above example the casino may be reimbursed by the credit card issuer for the value of the coins dropped into the coin tray. In another example, assume the casino is the subsidizing entity and that the offer presented to a player defines an obligation of playing a gaming device for an hour in exchange for a benefit of a discount on a product at a retailer being provided to an associated person designated by the player. In this example the retailer may provide the discount to the associated person and be subsequently reimbursed for the value of the discount by the casino. In some embodiments the entity that provides the benefit may be reimbursed for an amount greater than or less than the value of the benefit. For example, the entity that provides the benefit may be reimbursed for the value of the benefit plus a premium for processing the provision of the benefit. In another example the entity that provides the benefit may be reimbursed for the value of the benefit less an amount for the lead on a new customer (e.g., in the above example where the associated person obtains the discount from the retailer the retailer benefits by acquiring a new potential customer by having the associated person purchase the product from the retailer).

It should be noted that in some embodiments a subsidizing entity may prepay, to the entity that will provide the benefits, an amount based on the value of the benefits to be provided. For example, a credit card issuer may provide $20,000 to a casino for use in providing benefits of $20 to players in exchange for the players' commitments to apply for a credit card from the credit card issuer. In some embodiments the monetary amount prepaid by a subsidizing entity may be utilized to determine whether an offer should be provided to a player. For example, before an offer is provided a determination may be made as to whether a balance of the prepaid amount is at least equal to the value of the benefit defined by the offer.

The obligation 704 stores an indication of the obligation the player must commit to in exchange for the corresponding benefit. An obligation comprises any task that a player must commit to in order to obtain the corresponding benefit defined by the offer. An obligation is not a requirement or step of conventional play of a game at a gaming device (e.g. making a selection during a bonus round of a game) but is an obligation that a player commits to perform outside of the conventional play of any game the player may be playing when the offer is provided. An obligation may or may not be a gambling-related obligation. It should be noted that an offer may define more than one obligation. In embodiments where an offer defines a plurality of obligations the player may or may not be required to perform each of the obligations defined by the offer in order to obtain the corresponding benefit. For example, the player may be allowed to choose a subset of the obligations defined by the offer (e.g., one of the plurality of obligations) and be provided with the corresponding benefit in exchange for committing to the subset of obligations. An obligation defined by an offer may or may not be defined by the subsidizing entity associated with the offer or by the same entity that defined the corresponding benefit. For example, a subsidizing entity other than a casino may provide the offer or define a benefit while the casino may specify one or more of the obligations defined by the offer.

Examples of gambling-related obligations include but are not limited to (i) playing a specified game or gaming device for a predetermined period of time or for a predetermined number of rounds; (ii) placing a specified wager amount for a specified period of time or for a predetermined number of rounds; and (iii) playing a game or gaming device until an occurrence of a specified event (e.g. obtaining a specified outcome, a specified payout amount, or winning a specified total amount of payout amounts).

Examples of obligations that are not gambling-related include but are not limited to (i) purchasing a product or service (e.g., signing up for a magazine subscription, switching to a new service provider, or buying $20 worth of books from Amazon.com™); (ii) using a product or service (e.g., applying for a new credit card, using a new long distance provider for a trial period, printing at least 100 pages per week from a specified brand of printer, receiving 3 free new issues of a magazine, test driving a car); (iii) providing a product or service (e.g., providing advice via a Web site, donating to a specified cause or organization); (iv) selling a product or service (e.g., selling a product on eBay™, providing advice for a fee); (v) providing information (e.g. answering survey questions or giving permission to access personal information such as medical files or credit report); (vi) viewing information (e.g., watching an advertisement or other video clip, listening to a message that is prerecorded or from a live person); (vii) convincing another person to perform one or more activities (e.g., convincing a friend to test drive a car or buy a product); and (viii) visiting a retailer (e.g. visiting a Web site of an online retailer or visiting a store location of a brick-and-mortar retailer).

An obligation may specify further conditions such as a requirement to begin an activity defined by the obligation within a specified period of time, before a specified time or after a specified time. Another example of a further condition is a requirement to finish an activity defined by the obligation within a specified period of time or by a specified time. Further, an obligation may require a commitment from a person different from the player accepting the offer (e.g., a commitment from an associated person that is to be provided the benefit defined by the offer) or an activity to be performed by a person different from the player accepting the offer (e.g. the obligation may be to convince a friend or family member of the player to switch service providers or test a product).

An obligation may be defined at the time the corresponding offer is entered into the table 435 or at another time. For example, as discussed below, an obligation may be defined on an ad hoc basis based on revenue management principles of a casino (e.g., once a casino determines that not enough players are playing a particular type of gaming device it may define the playing of the gaming device for a specified period of time as an obligation defined by an offer until the number of players playing the particular type of gaming device reaches an acceptable number). An obligation may also be defined on an ad hoc basis based on revenue management principles of another entity such as a subsidy provider that is not a casino. For example, a subsidy provider that is a car manufacturer may define an obligation as a test drive of a model A of the manufacturer's cars. However, as the manufacturer determines that the sales of model A are at an acceptable level but the sales level of model B is below an acceptable level the manufacturer may define the obligation to be a test drive of model B rather than model A. An obligation may be defined based on other information such as player-related information. For example, in the above example the particular model to be test driven as defined by the obligation may be determined based on the income level of the player to whom the offer is to be provided.

It should be understood that an obligation defined by an offer may or may not be performed, or be capable of being performed, at a gaming device or gaming table. For example, in some embodiments an obligation comprises an activity that cannot be performed at a gaming device (e.g., test driving a car). In other embodiments an obligation may be performed at a gaming device (e.g., answering survey questions or applying for a credit card). In the embodiments where an obligation may be performed at a gaming device, the player may be allowed to defer the performance of the activity. For example, a player may be given an option to answer survey questions at a gaming device or on a Web site at a later time. In the embodiments where the player performs an obligation at a gaming device and the obligation is a non-gambling related obligation the player may be presented with the means of performing the obligation once the player accepts the offer (e.g. the player may be presented with a survey or credit card application on a screen of the gaming device). As discussed above, the benefit corresponding to an obligation may be provided, e.g., at the time of the player's acceptance of the offer defining the obligation and benefit or once the player satisfies the obligation.

The player-related prerequisite 706 stores an indication of any prerequisites related to a player that may need to be satisfied before the offer corresponding to the prerequisite may be provided to the player. A player-related prerequisite is a prerequisite that is based on information related to a player outside of any gambling activity the player may be participating in at the time of receiving the offer. For example, a player-related prerequisite may be a demographic profile of the player. A player prerequisite may be specified by the entity providing the offer to the system of the present invention, such as a subsidy provider. A player prerequisite may also be specified by the casino in which the offer is to be provided, in embodiments wherein the casino is not acting as the subsidy provider for a particular offer, or an entity operating the primary controller 260 (FIG. 2). More than one player-related prerequisite may be specified. In embodiments where more than one player-related prerequisite is specified for a given offer, only one of the specified player-related prerequisites may need be satisfied before an offer is output to a player. In other embodiments all of the specified player-related prerequisites or a particular number of combination of the player-related prerequisites need be satisfied before the corresponding offer is output to a player.

A player-related prerequisite need not be based on information about a player that is the player to be provided with the corresponding offer. For example, a player-related prerequisite may specify a prerequisite about a player that is associated with the player that is to be provided with the corresponding offer (e.g., the prerequisite may pertain to a player that is sharing a casino hotel room with the player that is to be provided with the offer).

It should be understood that a player-related prerequisite may function as a trigger which causes an offer to be output to a player as well as an additional pre-requisite that need be satisfied after another event or condition triggers the potential provision of the offer. A player-related prerequisite need not be based on information that is stored on a player for any period of time before the output of the offer. For example, a player-related prerequisite may comprise (i) a reservation by a player of a hotel room in a hotel associated with a casino; (ii) a player's checking in to a hotel associated with a casino; or (iii) the purchase of a meal by the player in a restaurant associated with a casino. In some embodiments the occurrence of such an event related to a player may comprise a trigger an output of an offer to a player.

Other examples of player-related prerequisites comprise (i) player must be female; (ii) player must not have previously accepted this offer; (iii) player must not have previously accepted any offer; (iv) player must have previously rejected another offer; (v) player must not have been presented with another offer within a predetermined time period; (vi) player must visit the casino a predetermined number of times within a predetermined time period; (vii) player must not be a customer of a specified service provider that is the subject of the offer; (viii) player must not own the product that is the subject of the offer; (ix) player must have a specified credit rating; (x) player must have a specified income; (xi) player must have qualified to receive the offer based on a survey associated with the offer; and (xii) player must have performed an activity within a specified time period before the current date (e.g., traveled outside of the country). Other examples of player-related prerequisites are discussed above. Subsidy providers may specify player-related prerequisites when submitting an offer to the system in order to better target, and therefore at least theoretically increase the acceptance rate of, the offer.

The offer criterion 708 stores an indication of a criterion that must be satisfied before an offer may be provided to a player. An offer criterion may function as a trigger that causes an offer to be output to a player. In other words, in some embodiments an offer is output to a player once it is determined that the offer criterion corresponding to the offer has been met in relation to the player. In other embodiments an event or condition other than the offer criterion functions as a trigger which causes the potential output of an offer to a player and the offer criterion functions in the determination of whether to output the offer (i.e., the offer is only actually output if the offer criterion is satisfied). An offer criterion, in contrast to a player-related prerequisite, is criterion based on a condition of a gaming device or gambling activity rather than a characteristic associated with the player. The condition may be the condition of a gaming device the player is playing or the condition of another gaming device (e.g. a condition of a gaming device in close proximity to a gaming device the player is playing). Similarly, the gambling activity may be the gambling activity of the player or the gambling activity of another person (e.g., the gambling activity of a person in a different location of the casino). The condition of the gaming device may comprise a condition of a plurality of gaming devices. Similarly, the gambling activity may be the gambling activity of a plurality of players.

It should be understood that the information stored in player-related prerequisite 706 and the information stored in offer criterion 708 is not mutually exclusive (i.e., there may be some overlap in the information stored in the two fields). Of course in some embodiments the information stored in player-related prerequisite 706 and offer criterion 708 may be combined or segregated in a manner other than described above. An offer criterion may be specified by (i) a subsidizing entity associated with the offer; (ii) a casino or other owner or operator of a gaming device or table game; (iii) an entity operating the primary controller 260 (FIG. 2); or (iv) any combination thereof. It should be understood that more than one offer criterion may be specified for a given offer. In embodiments where more than one offer criterion is specified for a given offer, only one of the specified offer criteria may need be satisfied before an offer is output to a player. In other embodiments all of the specified offer criteria or a particular number of combination of the criteria need be satisfied before the corresponding offer is output to a player.

An offer criterion may be a specified event occurring at a gaming device. In some embodiments, for example, a gaming device may detect the occurrence of an event at a gaming device and output an offer to a player in response. Examples of such offer criterion include but are not limited to (i) initiation of a playing session; (ii) insertion of a player tracking card into a gaming device; (iii) insertion of payment into a gaming device; (iv) player placing a wager; (v) player placing a wager of a certain amount; (vi) winning a payout of a certain value; (vii) obtainment of a predetermined outcome (e.g., an outcome that corresponds to a predetermined payout amount or an outcome that does not correspond to any payout amount); (viii) an end to a playing session; (ix) removal of a player tracking card from a gaming device; (x) actuation of a cash out button of a gaming device; (xi) actuation of a change request button of a gaming device; (xii) obtainment of a predetermined intermediate outcome (e.g., deal of an initial hand in a video poker device or revelation of the first two reel symbols on the payline of a three reel slot machine); (xiii) detection of a pause in the play of the gaming device that lasts a predetermined amount of time; (xiv) the current time being a predetermined time (e.g., between 3:00 pm and 6:00 pm); and (xv) a signal being received from a computing device and/or an employee to output an offer.

As described above, an offer criterion at one gaming device may cause an offer to be output at another gaming device. For example, if a first player at a first gaming device wins a jackpot, the occurrence of this condition may cause an offer to be output to a second player of a second gaming device that is within a predetermined proximity to the first gaming device. An example of an effective offer to provide to the second player on the occurrence of such an event may be an offer that defines a benefit of an increased probability of winning a jackpot at the second gaming device (e.g., by substitution of a probability table that is more favorable to the player for the next ten (10) plays of the gaming device) since seeing a nearby player win a jackpot may make the second player very eager to win a jackpot as well. Another example of an effective offer to provide to a player on the occurrence of such an event may be an offer that defines a benefit of twenty (20) coins to be dropped into the second player's coin tray. Such a benefit may make the second player feel like a winner of a jackpot as well.

An offer criterion may also be the achievement of a specified condition of a gaming device. In some embodiments, for example, a gaming device or controller in communication with the gaming device may monitor a condition of the gaming device and output an offer in response to identifying that the condition satisfies a criterion. Examples of such offer criterion include but are not limited to (i) the credit balance of a gaming device reaching a predetermined amount (e.g., the balance may be monitored as it decreases until it reaches a low that is at least a predetermined minimum); (ii) the credit balance of a gaming device reaching an amount that, after the player makes the next wager, will be insufficient for another wager; (iii) a predetermined number of outcomes that do not correspond to a payout within a predetermined period of time; (iv) a predetermined percentage of outcomes that do not correspond to a payout; (v) a total amount of payouts within a play session that is below a predetermined amount; (vi) a total amount of payouts within a predetermined period of time that is below a predetermined amount; (vii) a total of a player's wagers (e.g. over the course of a playing session or other period of time) reaching a predetermined amount; (viii) an average wager of a player (e.g. over the course of a playing session or other period of time) reaching a predetermined amount; (ix) a decrease in the rate of play of a player; (x) a decrease in the wager placed per play by a player; (xi) a theoretical win of a player reaching a predetermined amount (e.g., over the course of a playing session or other period of time); (xii) an actual win/(loss) of a player reaching a predetermined amount (e.g., over the course of a playing session or other period of time); (xiii) a duration of a player's play session reaching a predetermined duration; and (xiv) an average duration of a player's play session reaching a predetermined duration (e.g., as measured over the course of a given year or other period of time).

In one embodiment an offer may be provided to a player at a time when the player has experienced a particular frustration while playing a gaming device. For example, in video poker many players experience significant frustration when "missing" a draw to a strong hand. A player dealt the ace of spades, king of spades, queen of spades, jack of spades, and 4 of hearts will undoubtedly be excited by the possibility of obtaining a royal flush after discarding the four of hearts. Unfortunately, in a Jacks or Better game the player will catch the ten of spades for the royal just one time in 47 tries. Many players feel frustrated by being tantalizingly close to a large royal flush payout only to receive a bad card that pays nothing or only a small payout. Other initial hands that players may feel disappointed in missing include: holding three of a kind and not making the full house or quads, holding an open-ended four card straight flush draw and missing the straight flush, or even holding a pair of deuces in a deuces wild game and making only three of a kind. In such an embodiment an offer criterion that functions as a trigger for outputting an offer may comprise the obtainment (or lack of obtainment) by a player of a particular final hand after being dealt a particular initial hand. For example, an offer criterion may comprise a table in which a record specifies a particular initial hand and corresponding final hands that each in turn correspond to a payout. If a player actually obtains one of the corresponding final hands an offer will not be output to the player. However, if a player does not obtain one of the corresponding final hands an offer will be output to the player.

Alternatively, it may be determined whether a payout or a payout of at least a predetermined amount corresponds to a final hand dealt to a player as a result of a specified initial hand. If a payout or a payout of at least a predetermined amount is not obtained by the player the output of an offer may be triggered. Other methods of providing an offer to a player in response to a player experiencing a frustration such as described above are within the scope of the present invention.

Other methods of determining when or which offer to output to a player may be utilized by an operator of the systems of the present invention. For example, an offer may be output or selected based on revenue management considerations of a casino. Revenue management considerations include the availability of a product or service of the casino. Examples of the availability of a product or service of a casino include but are not limited to (i) the availability of hotel rooms in a hotel associated with the casino; (ii) the availability of tickets to an entertainment event occurring at the casino; and (iii) the availability of slot machines on a casino floor. For example, an operator of the systems of the present invention may determine that a certain gaming device or type of gaming device is currently not being played or not being played by a sufficient number of players. In this example an offer may thus be triggered where the obligation defined by the offer is an obligation to play the gaming device or type of gaming device for a specified amount of time and/or within a specified amount of time. In another example the determination of a predetermined number of tickets to an entertainment event may cause an offer to be output to a player wherein the benefit defined by the offer is one or more tickets to the entertainment event. As illustrated by the previous two examples, revenue management considerations may function not only to trigger the output of an offer to a player but may also function as a means for defining a benefit and/or an obligation of an offer on an ad hoc basis.

The subsidizing entity identifier 710 stores information uniquely identifying the subsidizing entity of the offer being defined by the record. A subsidizing entity identifier may comprise, for example, a string of alphanumeric digits. A subsidizing entity identifier may be selected or generated by, for example, controller 210 (FIG. 2A), primary controller 260 or one or more of the secondary controllers 270 and 280 (FIG. 2B), or the subsidizing entity. Subsidizing entities will be described in more detail below with respect to subsidizing entity database 445 (FIG. 9).

The penalty 712 stores information identifying a penalty that may be applied if a player fails to fulfill an obligation defined by an offer the player accepted. As illustrated in the available offers database 435, not every offer need identify a penalty. For example, some subsidizing entities may be willing to accept the risk that a player will not satisfy an obligation the player committed to. In embodiments where the benefit is not provided to a player or associated person until the player or any other required person fulfills the obligation a penalty may not be necessary (the withholding of the benefit may be enough incentive to encourage the fulfillment of the obligation). A penalty may be assessed to (i) the player who committed to the obligation defined by the offer; (ii) the associated person designated by the player; or (iii) a combination thereof. A player is informed of any penalty associated with an offer at the time the player is presented with the offer.

Examples of penalties include but are not limited to (i) a monetary charge or debit to a financial account identifier; (ii) an adjustment to the operation of a gaming device (e.g. a decrease in available payout amounts of any gaming device operated by the player during the player's next visit to the casino or an unavailability of certain bonuses when the player subsequently plays a specified game in a casino); (iii) an unavailability of a service or product to a player (e.g. the player will be unable to stay in the casino hotel for a predetermined amount of time); (iv) publication of the player's failure to fulfill the obligation; (v) a return of the benefit or a monetary amount based on the value of the benefit; (vi) an inability by the player to receive subsequent offers; (vii) a deduction from a balance of alternate currency associated with a player (e.g. a deduction of comp player points or frequent flier miles).

In some embodiments a player may be provided with an opportunity to avoid a penalty even after the player fails to fulfill an obligation corresponding to the penalty within a predetermined amount of time. For example, assume a player commits to visiting a retailer within thirty (30) days in exchange for a piece of jewelry being provided to the player's spouse at the time the player commits to the obligation. Assume further that the penalty defined by the offer is a return of the piece jewelry. Once it is determined that the player has failed to visit the retailer within the 30 days the player may be provided with a message (e.g., via e-mail) that the spouse will be contacted with a request for a return of the jewelry unless the player visits the retailer within the following five (5) days. In some embodiments the player may be required to commit to an obligation in addition to the original obligation in order to avoid the penalty (e.g., in the above example the player may now be required to not only visit the retailer but to also complete a minimum purchase with the retailer).

The monitoring function of whether a player has fulfilled an obligation and/or whether a penalty should be assessed may be performed by (i) a casino; (ii) a subsidizing entity; (iii) an entity providing a benefit; (iv) an entity operating controller 210 (FIG. 2A), primary controller 260 or either of the secondary controllers 270 and 280 (FIG. 2B); (v) an entity operating any of the gaming devices 220 (FIG. 2A), or the gaming devices 275 and 285 (FIG. 2B); (vi) any other entity tasked with such a function; or (vii) a combination thereof. For example, assume a player commits to an obligation to visit a specified retailer within a specified period of time. Once the player commits to the obligation the retailer may be informed of the player's identity and the period of time within which the player must make the visit. The retailer may then monitor visiting customers to determine whether the player visits in fulfillment of the obligation. Once the retailer determines that the player has visited the retailer the retailer may inform the casino or other operator tasked with assessing a penalty corresponding to the player's failure to perform the task. If at the end of the predetermined period of time no indication of the player's visit to the retailer is received the penalty may be assessed. In such an example the player, at the time of committing to the obligation, may be provided with an identifier to provide to the retailer at the time of the player's visit to the retailer in order to aid the retailer in identifying the player as having visited in fulfillment of the obligation. The retailer may also be informed of the identifier provided to the player at the time the player commits to the obligation. Other methods of determining whether the player has fulfilled an obligation would be understood by one of ordinary skill in the art and are within the scope of the present invention.

Play Session Database

Referring to FIG. 8, a table represents the play session database 440 that may be stored at the controller 210, primary controller 260 or one or more of the secondary controllers 270 and 280 according to some embodiments of the present invention. According to another embodiment, some or all of the information in the play session database 440 may be stored at one or more of the gaming devices 220, 275, and 285 instead. According to yet another embodiment, some or all of the information in the play session database 440 may be stored on each individual player's player tracking card. The table includes entries identifying a play session of a player operating a gaming device or playing a table game in a casino. The table defines fields 802, 804, 806, 808, 810, 812, and 814 for each of the entries. The fields specify: a player identifier 802; a machine identifier 804; a rate of play 806; a duration of play 808; a theoretical win 810; an actual win/(loss) 812; and an average wager 814. It should be noted that the player identifier 802 may correspond to the player identifier 502 of the player database 425 (FIG. 5).

The information in the play session database 440 may be created and updated, for example, based on information received from a gaming device a player is operating or from a dealer of a table game a player is playing. For example, the information may be created when a player initiates a play session at a gaming device by, e.g. inserting a player tracking card into the gaming device or actuating a start button of the gaming device. The information may be subsequently updated as the play session of the player continues.

The player identifier 802 stores an indication of an identifier that uniquely identifies a player. A player identifier stored in player identifier field 802 may correspond to or be the same as one or more of the player identifiers stored in player identifier field 502 of the player database 425 (FIG. 5).

The gaming device identifier 804 stores information identifying a particular gaming device or group of devices currently being played by the player corresponding to player identifier 802. In embodiments where the player is playing a table game, the gaming device identifier field 804 may be left blank or may store an identifier identifying the table, room, or dealer of the table game the player is playing.

The rate of play 806 stores an indication of the rate at which the player is playing the game during the play session. The rate of play may comprise, for example, a number of handle pulls or actuations of a starting controller of a slot machine, per unit of time (e.g., per hour). The rate of play may also comprise, for example, a number of hands dealt to a player playing a video poker device, per unit of time. The rate of play 806 may be updated for a given player on a continuous or periodic basis.

The duration of play 808 stores an indication of the length of time that has passed since a particular play session was begun. For example, a play session may be deemed to be initiated when a player first inserts a player tracking card into the gaming device. Alternatively, a play session may be deemed to be initiated when a starting controller of a gaming device is actuated after a pause of a predetermined duration or when payment is inserted into the gaming device. At this time the duration of the play session may be set to zero time and the passage of time tracked until an end of the play session is determined. A play session may be deemed to have ended upon the occurrence of, for example, (i) the removal of the player tracking card from a gaming device; (ii) a pause of a predetermined duration in the play of the gaming device; and/or (iii) a balance of zero credits in the credit meter of the gaming device (e.g., due to the player's wagering of the remaining credits or due to the player's actuation of a cash out button of the gaming device).

The theoretical win 810 stores information indicating the theoretical win of the player during the play session based on the gambling activity of the player during the play session. The actual win/[loss] 812 stores an indication of the actual win or loss amount of the player over the duration of the play session. A loss is indicated as an amount in brackets. The average wager 814 stores an indication of the average wager amount placed by the player on a round of the game over the duration of the play session. The theoretical win 810, the actual win/[loss] 812, and the average wager 814 may each be individually updated for a given play session of a player on a continuous or periodic basis.

The play session database 440 or the information stored therein may be stored at a gaming device and/or at a slot server. For example, a gaming device may temporarily store and update the information on a continuous basis and periodically communicate to the slot server a current status of the information. Further, any of the information stored in the play session database may be used to determine whether an event has occurred at the gaming device corresponding to the play session or whether a condition of the gaming device is such that an offer criterion 708 of an offer in the available offers database 435 (FIG. 7) is satisfied. Any of the information stored in the play session database is suitable as the basis of an offer criterion 708. Other information about a play session in addition to that illustrated in play session database 430 may be stored and used in determining whether an offer (and/or, e.g. which particular offer) should be provided to a player.

Subsidizing Entity Database

Referring to FIG. 9, a table represents the subsidizing entity database 445 that may be stored at the controller 210, primary controller 260 or one or more of the secondary controllers 270 and 280 according to some embodiments of the present invention. According to another embodiment, some or all of the information in the subsidizing entity database 445 may be stored at one or more of the gaming devices 220, 275, and 285 instead. The table includes entries identifying subsidizing entities that have provided offers to be presented to players in a casino. The table defines fields 902, 904, 906, 908 and 910 for each of the entries. The fields specify: a subsidizing entity identifier 902; a subsidizing entity name 904; an account identifier 906; contact information 908; and a rank 910.

The information in the subsidizing entity database 445 may be created and updated, for example, based on information received from a subsidizing entity. For example, the information may be created when a subsidizing entity first provides to a casino an offer to be provided to players at the casino. The information may be subsequently updated, e.g., when a subsidizing entity requests to update the information.

A subsidizing entity is any entity that benefits from the offer being presented to a player. A subsidizing entity may provide payment or other consideration to the operator of the systems of the present invention in exchange for the offer being provided to a player. A subsidizing entity defines (i) the benefit of the offer; (ii) the obligation of the offer; (iii) penalties of the offer; or (iv) any combination thereof. Examples of subsidizing entities include but are not limited to (i) a casino; (ii) a retailer (online or bricks-and-mortar); (iii) a restaurant (which may or may not be located within a casino); (iv) a non-profit organization; (v) an individual; (vi) a corporation; (vii) a credit card issuer; and (viii) a manufacturer. More than one subsidizing entity may be associated with a single offer. The player may or may not be informed of or provided with information regarding the identity of the subsidizing entity associated with an offer the player is presented with and/or accepts.

The subsidizing entity identifier 902 may comprise any identifier (e.g., an alphanumeric identifier) that uniquely identifies a subsidizing entity. A subsidizing entity identifier 902 may correspond or be identical to one or more of the subsidizing entity identifiers 710 stored in the available offers database 435 (FIG. 7). The account 906 stores information identifying an account associated with the subsidizing entity. Such an account may be an account with a casino or other operator of systems of the present invention or an account with a financial institution such as a bank. The account may comprise for example, a debit, credit, or charge account. The account may be utilized, for example, to debit an amount based on benefits provided on behalf of the subsidizing entity and other services provided on behalf of the subsidizing entity.

The contact information 908 stores information indicating a means of contacting the subsidizing entity of each record. Such contact information may comprise, for example, a postal or e-mail address and/or a telephone number. Contact information may be used, for example, to provide a bill to the subsidizing entity or to communicate with the subsidizing entity regarding offers subsidized by the subsidizing entity.

The rank 910 stores, in accordance with one embodiment of the present invention, a rank of each subsidizing entity. Such a rank may be used, for example, to select one of a plurality of offers that qualify for presentation to a player. For example, if an event at a gaming device satisfies the offer criterion 708 associated with more than one offer in the available offers database 435 (FIG. 7), the subsidizing entity associated with each offer may be determined. The rank of each determined subsidizing entity may then be determined based on the rank 910 stored in the subsidizing entity database 445 and the offer corresponding to the subsidizing entity with the highest rank may be presented to the player. A particular rank may be associated with a particular subsidizing entity based on various factors. For example, a subsidizing entity may pay to be ranked and a higher payment may correspond to a higher rank. A rank may also be determined based on, for example, (i) the number of offers subsidized by the subsidizing entity; (ii) the number of times an offer subsidized by the subsidizing entity is accepted by players; (iii) the value of the benefit defined by an offer of the subsidizing entity; (iv) the complexity of the obligation defined by an offer of the subsidizing entity; and (v) a combination thereof.

In some embodiments individual offers available via the system of the present invention may be ranked. Such a ranking of offers may be in addition to or instead of a ranking of the subsidizing entities.

Accepted Offer Tracking Database

Referring to FIG. 10, a table represents the accepted offer database 450 that may be stored at the controller 210, primary controller 260 or one or more of the secondary controllers 270 and 280 according to some embodiments of the present invention. According to another embodiment, some or all of the information in the accepted offer database 450 may be stored at one or more of the gaming devices 220, 275, and 285 instead. According to yet another embodiment, some or all of the information in the accepted offer database 450 may be stored on each individual player's player tracking card. The table includes entries identifying offers that have been accepted by players of a casino. The table defines fields 1002, 1004, 1006, 1008, and 1010 for each of the entries. The fields specify: a player identifier 1002; an offer identifier 1004; an associated person identifier 1006; a status of obligation 1008; and a status of benefit 1010.

The information in the accepted offer tracking database 450 may be created and updated, for example, based on information received from a gaming device. For example, the information may be created when a player accepts an offer at a gaming device. The information may be subsequently updated, e.g., when a player fulfills an obligation or a benefit is provided to the player or an associated person.

The player identifier 1002 stores an indication of a player identifier that uniquely identifies a player who accepted the offer corresponding to a given record of the accepted offer tracking database 450. The player identifier 1002 may comprise an alphanumeric code. A player identifier stored in the player identifier field 1002 may correspond to or be the same as one or more of the player identifiers stored in player identifier field 502 in the player database 425 (FIG. 5) or the player identifier field 802 in the play session database 440 (FIG. 8).

The offer identifier 1004 stores information uniquely identifying an offer that was accepted by the player identified by the player identifier of the same record. The offer identifier 1004 may comprise, for example, an alphanumeric code. An offer identifier stored in the offer identifier field 1004 may correspond to or be the same as one or more offer identifiers stored in offer identifier field 700 in the available offers database 435 (FIG. 7). An offer identifier stored in the offer identifier field 1004 may be used to determine, for example, (i) the benefit to be provided to the player that accepted the offer of the same record, (ii) any additional requirements of the offer that the player is to abide by, or (iii) what penalty, if any, is to be assessed to the player and/or an associated person designated by the player.

The associated person identifier 1006 stores an identification of an associated person, if any, that the player has designated as the person to be provided with the benefit defined by the offer. The associated person identifier 1006 may comprise any information sufficient to identify an associated person. An associated person identifier stored in the associated person identifier field 1006 may correspond to or be the same as one or more of the associated person identifiers stored in the associated person identifier field 408 of the player database 425 (FIG. 5) and/or the associated person field 602 of the associated person database 430 (FIG. 6). As illustrated in table 450, more than one associated person identifier may be stored in association with a particular player identifier 1002.

Further the same associated person identifier 1004 may be stored in association with more than one player identifier 1002.

The status of obligation 1008 stores an indication of the status of the obligation defined by the offer of a given record. The example statuses illustrated in table 450 are (i) a status of "satisfied" (indicating that the player has satisfied the obligation); (ii) a status of "failed" (indicating that the player has failed to satisfy the obligation); (iii) a status of "in progress" (indicating that the player is currently attempting to satisfy the obligation); and a status of "pending" (indicating that a player has not yet attempted to satisfy an obligation but has time remaining to do so before the player is considered to have failed to fulfill the obligation). Other appropriate statuses may be understood by one of ordinary skill in the art and are within the scope of the present invention.

The status of benefit 1010 stores an indication of whether the benefit defined by the offer of a given record has or has not been provided. As discussed above, a benefit may be provided to the player or to an associated person. Thus a status of "provided" indicates that the benefit has been provided to the player if no associated person is indicated in the record and that the benefit has been provided to the associated person if one or more associated persons are indicated in the record. In an embodiment wherein a benefit, or portion of a benefit, is provided to both a player and an associated person or to more than one associated person, a separate indication for each of the persons to whom the benefit is to be provided may be stored. As also discussed above, a benefit may be provided at the time a player commits to an obligation and/or at the time a player satisfies the obligation. If a benefit is provided at the time a player commits to an obligation but the player subsequently fails to satisfy the obligation a penalty may be assessed. Such an example is illustrated in the second record of table 450. In the example of this record the system may, upon determining that the status of the benefit is "provided" and the status of the obligation is "failed" retrieve the penalty corresponding to the offer based on the offer identifier. The system may then assess the penalty as appropriate.

4. Description of Flow Diagram

Figure 11A:
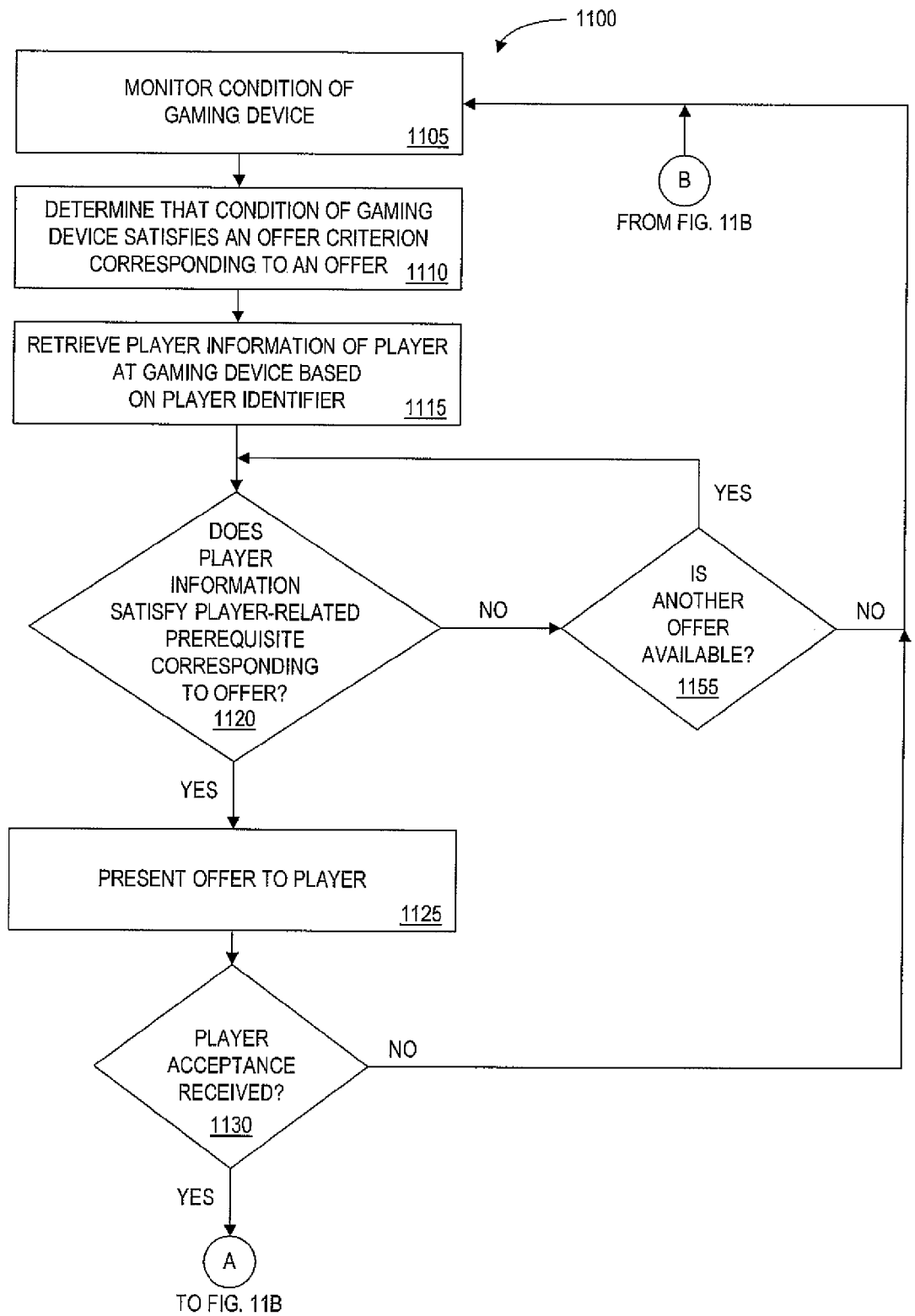
FIGS. 11A and 11B comprise a flow diagram illustrating an exemplary process according to an embodiment of the present invention.
Figure 11B:
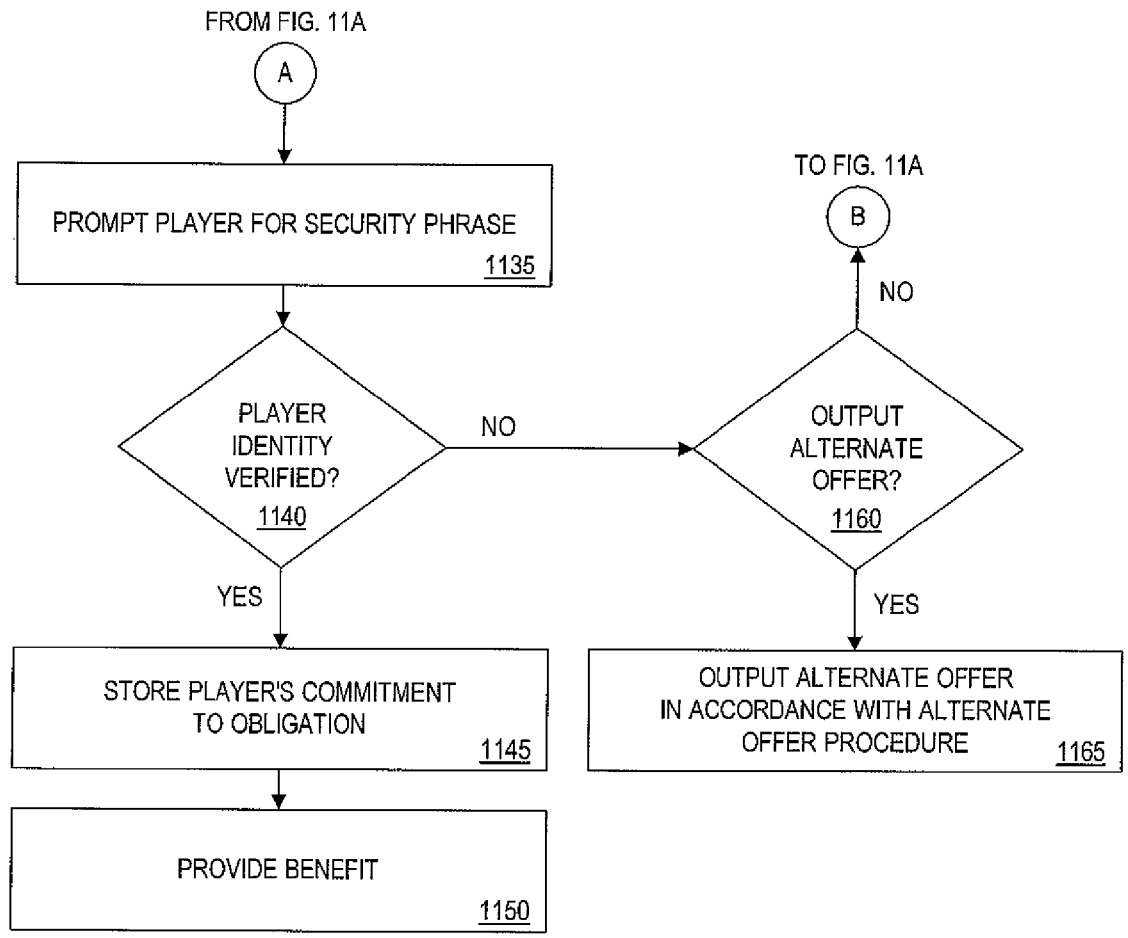

Referring now to FIGS. 11A and 11B, a flow diagram illustrating an embodiment of the present invention is illustrated as process 1100. Process 1100 may be performed by (i) a gaming device (such as one of the gaming devices 220, 275, and 285); (ii) a controller in communication with the gaming device (such as one of the controller 210, the primary controller 260, and one or more of the secondary controllers 270 and 280); or (iii) a combination thereof.

Process 1100 begins with step 1105 which comprises monitoring a condition of the gaming device. Conditions of a gaming device that may be monitored are described above with reference to the available offers database 435 (FIG. 7). In step 1110 it is determined that a condition of a gaming device satisfies an offer criterion of an offer (e.g., as indicated in the available offers database 435). It may be that a condition of the gaming device satisfies an offer criterion of more than one offer. In such a case all of the offers may be selected in step 1110 or a subset of the offers may be selected in step 1110 (e.g. the offer associated with a subsidizing entity having the highest rank is selected). Once an offer is selected, the player information associated with the player playing at the gaming device is retrieved in step 1115. Such player information may comprise the type of player information stored in player database 425. In an alternate embodiment of step 1115 player information may be obtained via questions presented to the player at the gaming device. Such information may also be gathered to supplement and/or confirm the information stored in the player database 425.

Once the player information is obtained it is determined, in step 1120, whether the player information satisfied the player-related prerequisite corresponding to the offer selected in step 1110 above. If the player information does satisfy the player-related prerequisite the process 1100 continues to step 1125, where the offer is presented to the player. An offer may be presented to a player in various ways. Examples of how an offer may be presented to a player include but are not limited to (i) a visual presentation (which may be accompanied by audio) on a screen associated with the gaming device; (ii) an audio presentation via a microphone associated with the gaming device; (iii) printing of the offer or outputting of the offer on paper; and (iv) an oral presentation by an employee of a casino. The presentation of the offer to the player may be preceded by a step of pausing the game play of the gaming device the player is playing. For example, the current round of the game the player is playing may be momentarily paused and a visual presentation of the offer overlaid or superimposed on a screen of the gaming device on which the outcomes of the game are presented.

If it is determined, in step 1120, that the player information does not satisfy the player-related prerequisite corresponding to the selected offer the process 1100 continues to step 1155. In step 1155 it is determined whether there is another offer available the offer criterion of which is satisfied by a condition of the gaming device. For example, if more than one offer was initially identified in step 1110 one of the remaining offers that was not previously selected may be selected in step 1155. If another offer is available, the process 1100 returns to step 1120 where it is determined whether the player related information previously obtained satisfied the player-related prerequisite corresponding to the offer selected in step 1155. It may be necessary to obtain additional information from the player in order to determine whether the player-related prerequisite is satisfied. If this is so, one or more questions may be presented to the player to obtain the necessary additional information.

Once the offer is presented to the player in step 1125, it is determined in step 1130 whether an acceptance of the offer is received from the player. If an acceptance is received, the process 1100 proceeds to step 1135. If an acceptance of the offer is not received in step 1130 (or a rejection of the offer is received) the process 1100 loops back to step 1105, where a condition of the gaming device is monitored. In an alternate embodiment the process 1100 may proceed to step 1155 and a determination of whether there is another offer available may performed if an acceptance of the offer is not received in step 1130. In yet another alternate embodiment, if it is determined in step 1130 that a player acceptance has not been received, a modification of the previously presented offer may be performed and the offer may be presented again in its modified form to the player (e.g., the value of the benefit of the offer may be increased).

In step 1135 the player is prompted to enter the security phrase associated with the player identifier inserted into the gaming device. Such a security phrase may be retrieved from the record corresponding to the player identifier in the player database 425 (FIG. 5). This step may be especially important in embodiments where the offer defines an obligation that is not to be performed at the gaming device, defines a benefit to be provided to the player before the player satisfies the obligation defined by the offer, and/or defines a penalty to be assessed to the player associated with the player identifier inserted into the gaming device.

If, in step 1140, it is determined that the player's identify has not been successfully verified (e.g., the player entered or selected a security phrase that does not correspond to the security phrase corresponding to the player identifier) the process 1100 proceeds to step 1160. In step 1160 it is determined whether an alternate offer is to be output to the player. For example, it may be determined in step 1160 whether an offer that was identified in step 1110 does not present some of the concerns described above (e.g., the offer defines an obligation that must be performed at the gaming device, the benefit defined by the offer is not provided to the player until the player satisfies the obligation, and there is no penalty defined by the offer) this alternate offer may be presented to the player. Alternatively, one or more offers specifically targeted to such a scenario (i.e., where the identity of the player has not been verified) may be selected. Such a specifically targeted offer may comprise an offer where the obligation, for example, comprises a registration by the player currently playing at the gaming device with the casino for a player tracking card. Additional information related to the player currently playing at the gaming device may also be gathered in determining whether an alternate offer is available. In one embodiment, the provision by the player of such additional information (e.g., demographic information) may serve to satisfy an obligation of an alternate offer.

If it is determined in step 1160 that an alternate offer will not be output, the process 1110 loops back to step 1100. Additionally, a message may be output to the player currently playing at the gaming device indicating that he is not the player identified by the player tracking card inserted into the gaming device.

If, in step 1140, it is determined that the player identity is verified the process 1100 proceeds to step 1145 where an indication of the player's commitment to the offer is stored (e.g., in the accepted offer tracking database 450). The process 1100 then proceeds to step 1150 where the benefit is provided to the player. Step 1150 may comprise determining what the benefit to be provided to the player is (e.g., by accessing the available offers database 435 based on the offer identifier of the offer accepted by the player). The status of the benefit may accordingly be updated in the accepted offer tracking database 450.

5. Conclusion

Although the present invention has been described with respect to a preferred embodiment thereof, those skilled in the art will note that various substitutions may be made to those embodiments described herein without departing from the spirit and scope of the present invention.

What is claimed is:

1. A method of operating a gaming device, said method comprising:
 (a) determining if a predefined event occurs for a gaming device associated with a wagering game; and
 (b) in response to an occurrence of the predefined event for the gaming device, outputting, via the gaming device, an offer to a player of the gaming device, said offer defining a benefit to be provided to the player upon the player indicating an agreement to perform an obligation defined by the offer within a specified period of time, said obligation being independent of any part of any play of the wagering game being played when the offer is output.

2. The method of claim 1, wherein the predefined event comprises:
 a loss by the player of a monetary amount due to playing of the wagering game.

3. The method of claim 2, wherein the benefit corresponds to the monetary amount.

4. The method of claim 2, further comprising presenting to the player an indication of the monetary amount of the loss by the player.

5. The method of claim 4, further comprising presenting to the player the indication of the monetary amount in connection with the offer.

6. The method of claim 5, wherein the benefit is a monetary amount corresponding to the amount of the loss by the player.

7. The method of claim 1, wherein the predefined event comprises:
 a credit meter balance associated with the player reaching a predefined magnitude.

8. The method of claim 1, wherein the predefined event comprises:
 a credit meter balance associated with the player falling below a predefined magnitude.

9. The method of claim 8, wherein the credit meter balance falling below a predefined magnitude comprises:
 the credit meter balance falling below an amount of credits that is equal to a predetermined wager amount for a play of the wagering game.

10. The method of claim 9, wherein the predetermined wager amount is a maximum wager amount permitted in the wagering game.

11. The method of claim 9, wherein the predetermined wager amount is a minimum wager amount permitted in the wagering game.

12. The method of claim 1, further comprising:
 identifying the occurrence.

13. The method of claim 12, further comprising:
 causing an indication of the occurrence of the predefined event to be communicated to a server in communication with the gaming device, responsive to identifying the occurrence.

14. The method of claim 13, wherein the outputting occurs in response to receiving from the server an instruction to output the offer.

15. The method of claim 13, wherein at least some of the communication between the gaming device and server is made over a wireless network.

16. The method of claim 1, wherein the outputting occurs in response to an identification of the occurrence by a server in communication with the gaming device.

17. The method of claim 16, wherein the outputting occurs in response to receiving data including an instruction to output the offer from the server.

18. The method of claim 17, wherein the instruction includes an indication of the offer.

19. The method of claim 17, wherein the data received from the server includes data corresponding to at least one of the benefit and the obligation.

20. The method of claim 1, further comprising:
 processing a player's response to the offer.

21. The method of claim 20, wherein receiving the player's response further comprises:
 determining whether the player's response indicates an acceptance of the offer.

22. The method of claim 21, wherein determining whether the player's response indicates an acceptance of the offer comprises determining whether the player has touched a predetermined area of a touch screen associated with the wagering game.

23. The method of claim 21, further comprising:
 if the player's response does not indicate an acceptance of the offer, outputting a second offer to the player, wherein the second offer defines at least one of: (i) a second benefit that is different from the benefit defined by the first offer and (ii) a second obligation that is different from the obligation defined by the first offer.

24. The method of claim 21, further comprising:
causing the benefit to be provided if the player's response indicates the acceptance of the offer.

25. The method of claim 1, further comprising:
causing the benefit to be provided once the player performs the obligation.

26. The method of claim 25, wherein causing the benefit to be provided comprises causing an amount of credits to be added to a credit meter balance associated with the player, the credits being usable for wagering on the wagering game.

27. The method of claim 25, further comprising indicating to the player a confirmation that the offer has been accepted.

28. The method of claim 27, wherein the confirmation comprises a physical indicium representative of an acceptance of the offer.

29. The method of claim 28, wherein the physical indicium includes a cashless gaming receipt.

30. The method of claim 27, wherein the confirmation comprises a lottery ticket.

31. The method of claim 25, wherein causing the benefit to be provided comprises causing the benefit to be provided to the player.

32. The method of claim 1, wherein outputting the offer further comprises:
causing the wagering game to be paused while the offer is being outputted.

33. The method of claim 32, further comprising:
resuming the wagering game if the player responds to the offer in a manner that indicates that the player has not accepted the offer.

34. The method of claim 32, further comprising:
resuming the wagering game if the player responds to the offer in a manner that indicates that the player rejects the offer.

35. The method of claim 1, wherein outputting the offer comprises outputting a visual representation of the offer on a display device of the gaming device.

36. The method of claim 35, wherein the display device is configured to output game outcomes to the player.

37. The method of claim 1, further comprising:
determining that the player has accepted the offer; and
storing an indication of the acceptance, wherein the indication of the acceptance comprises data relating to the player's agreement to perform the obligation within the specified period of time.

38. The method of claim 37, further comprising:
accessing the stored indication of the acceptance.

39. The method of claim 38, further comprising:
determining, based at least in part on the stored indication, what types of offers are accepted by players.

40. The method of claim 38, further comprising:
determining, based at least in part on the stored indication, what types of offers are accepted by the player.

41. The method of claim 38, further comprising:
determining whether the player has performed the obligation within the specified period of time; and
determining, based at least in part on the stored indication and at least in part on whether the player has performed the obligation within the specified period of time, whether to assess a penalty to the player.

42. The method of claim 37, further comprising:
determining, based at least in part on the stored indication, what types of offers are accepted by players.

43. The method of claim 37, further comprising:
determining, based at least in part on the stored indication, what types of offers are accepted by the player.

44. The method of claim 37, further comprising:
determining whether the player has performed the obligation within the specified period of time; and
determining, based at least in part on the stored indication and at least in part on whether the player has performed the obligation within the specified period of time, whether to assess a penalty to the player.

45. The method of claim 1, further comprising:
determining whether the player has performed the obligation within the specified period of time.

46. The method of claim 45, further comprising:
determining, based at least in part on whether the player has performed the obligation within the specified period of time, whether to assess a penalty to the player.

47. The method of claim 1, wherein the obligation comprises an obligation to answer at least one survey question.

48. The method of claim 47, wherein the at least one survey question is output to the player via a display device of the gaming device.

49. The method of claim 48, further comprising pausing the wagering game for at least a portion of the time required for the player to answer the at least one survey question.

50. The method of claim 49, further comprising resuming the wagering game when the player fulfills the obligation to answer the at least one survey question.

51. The method of claim 47, wherein the at least one survey question is based on an advertisement output to the player.

52. The method of claim 47, wherein the at least one survey question is based on at least one product previously experienced by the player.

53. The method of claim 1, wherein the gaming device comprises at least one of a personal computer, a portable computer, a palm-top computer, a hand-held computer, a personal digital assistant or a combination thereof.

54. The method of claim 53, further comprising:
communicating information associated with the offer over a wireless network.

55. The method of claim 1, further comprising determining information associated with the player, wherein outputting the offer is at least partially based on the information.

56. The method of claim 55, wherein the information comprises information regarding the player's wagering.

57. The method of claim 56, wherein the information regarding the player's wagering comprises information regarding the player's wagering on the wagering game.

58. The method of claim 1, wherein the benefit comprises a product and the obligation comprises a purchase of the product at a specified cost.

59. The method of claim 58, wherein the product comprises a gaming product.

60. The method of claim 59, wherein the gaming product comprises a wager in a specified wagering game.

61. The method of claim 60, wherein the specified wagering game comprises a lottery.

62. The method of claim 61, further comprising, upon receiving an indication of the acceptance of the offer by the player, outputting a lottery ticket.

63. The method of claim 58, wherein the product may be purchased at least partially using a portion of a credit meter balance associated with the gaming device.

64. The method of claim 63, wherein the outputting of the offer to the player is dependent on the player having a credit meter balance associated with the gaming device which is greater than or equal to a minimum balance.

65. The method of claim 64, wherein the minimum balance is equal to the specified cost.

66. The method of claim 63, wherein the predefined event comprises an initiation of a cash out function on the gaming device by the player.

67. The method of claim 66, wherein the cash out function is paused pending a response by the player to the offer.

68. The method of claim 66, further comprising, if the player's response includes the acceptance of the offer, enabling the player to purchase the product using at least a portion of the credit meter balance prior to completion of the cash out function.

69. The method of claim 66, wherein if a player's response to the offer includes the acceptance of the offer, outputting, via the gaming device:
a first cashless gaming receipt indicating the acceptance of the offer; and
a second cashless gaming receipt redeemable for an adjusted credit meter balance, the adjusted credit meter balance comprising the credit meter balance at the time of initiation of the cash out function, less the specified cost.

70. The method of claim 69, wherein the first cashless gaming receipt comprises a lottery ticket.

71. The method of claim 1, wherein the predetermined event comprises an initiation of a cash out function on the gaming device by the player.

72. The method of claim 1, wherein the obligation comprises accepting a dining reservation.

73. The method of claim 1, wherein the offer at least partially relates to a benefit or obligation associated with at least one of an owner or operator of the gaming device.

74. The method of claim 1, wherein the offer at least partially relates to a benefit or obligation associated with a third party not associated with an operator of the gaming device.

75. The method of claim 1, wherein the offer at least partially relates to a benefit or obligation associated with a third party not associated with an owner of the gaming device.

76. The method of claim 1, which includes causing a random number generator to generate random numbers and utilizing the generated random numbers to determine an outcome for a play of the wagering game.

77. A method of operating a gaming device, said method comprising:
(a) in response to a cash out request by a player of the gaming device, said gaming device operable to facilitate a wagering game, outputting, at the gaming device, an offer to the player,
said offer comprising an offer for the purchase of an entry into a lottery at a specified cost,
wherein the outputting of the offer is contingent on a credit meter balance associated with the player being at a level equal to or greater than the specified cost; and
(b) in response to an acceptance of the offer by the player, generating a lottery ticket confirming the entry into the lottery and a payout ticket redeemable for an adjusted credit meter balance, the adjusted credit meter balance being the difference between the credit meter balance and the specified cost.

78. A gaming device comprising:
at least one input device;
at least one display device;
at least one processor; and
at least one memory device which stores a plurality of instructions, which when executed by the at least one processor cause the at least one processor to operate with the at least one display device and the at least one input device to:
(a) enable a player to place wagers on plays of a wagering game;
(b) determine if a cash out request by the player occurs;
(c) in response to the cash out request by the player, output an offer to the player, said offer comprising an offer for the purchase of an entry into a lottery at a specified cost, said determination of whether to output the offer being contingent on a credit meter balance associated with the player being at a level equal to or greater than the specified cost; and
(d) in response to an acceptance of the offer by the player, generate a lottery ticket confirming the entry into the lottery and a payout ticket redeemable for an adjusted credit meter balance, the adjusted credit meter balance being the difference between the credit meter balance and the specified cost.

79. A gaming device comprising:
at least one input device;
at least one display device;
at least one processor; and
at least one memory device which stores a plurality of instructions, which when executed by the at least one processor cause the at least one processor to operate with the at least one display device and the at least one input device to:
(a) enable a player to place wagers on plays of a wagering game;
(b) determine if a predefined event occurs; and
(c) in response to an occurrence of the predefined event, output an offer to a player of said gaming device, said offer defining a benefit to be provided to the player upon the player indicating an agreement to perform an obligation defined by the offer within a specified period of time, said obligation being independent of any part of any play of the wagering game being played when the offer is output.

80. The gaming device of claim 79, wherein the predefined event comprises:
a loss by the player of a monetary amount due to playing of the wagering game.

81. The gaming device of claim 80, wherein the benefit corresponds to the monetary amount.

82. The gaming device of claim 80, wherein the plurality of instructions, when executed by the at least one processor, cause the at least one processor to operate with the at least one display device to display an indication of the monetary amount of the loss by the player.

83. The gaming device of claim 82, wherein the plurality of instructions, when executed by the at least one processor, cause the at least one processor to operate with the at least one display device to display the indication of the monetary amount in connection with the offer.

84. The gaming device of claim 83, wherein the benefit is a monetary amount corresponding to the amount of the loss by the player.

85. The gaming device of claim 79, wherein the predefined event comprises:
a credit meter balance associated with the player reaching a predefined magnitude.

86. The gaming device of claim 79, wherein the predefined event comprises:
a credit meter balance associated with the player falling below a predefined magnitude.

87. The gaming device of claim 86, wherein the credit meter balance falling below a predefined magnitude comprises:
the credit meter balance falling below an amount of credits that is equal to a predetermined wager amount for a play of the wagering game.

88. The gaming device of claim 87, wherein the predetermined wager amount is a maximum wager amount permitted in the wagering game.

89. The gaming device of claim 87, wherein the predetermined wager amount is a minimum wager amount permitted in the wagering game.

90. The gaming device of claim 79, wherein the plurality of instructions, when executed by the at least one processor, cause the at least one processor to identify the occurrence of the predefined event and cause the offer to be output responsive to identifying the occurrence.

91. The gaming device of claim 90, wherein the plurality of instructions, when executed by the at least one processor, cause the at least one processor to cause an indication of the occurrence to be communicated to a server in communication with the gaming device.

92. The gaming device of claim 91, wherein the plurality of instructions, when executed by the processor, cause the processor to receive from the server an instruction to output the offer and to cause the offer to be output in response to receiving the instruction.

93. The gaming device of claim 91, wherein the plurality of instructions, when executed by the at least one processor, cause the at least one processor to communicate with the server at least partially over a wireless network.

94. The gaming device of claim 79, wherein the plurality of instructions, when executed by the at least one processor, cause the at least one processor to cause the offer to be output responsive to an identification of the occurrence by a server in communication with the gaming device.

95. The gaming device of claim 94, wherein the plurality of instructions, when executed by the at least one processor, cause the at least one processor to cause the offer to be output responsive to receiving data including an instruction to output the offer from the server.

96. The gaming device of claim 95, wherein the instruction includes an indication of the offer.

97. The gaming device of claim 95, wherein the data received from the server includes data corresponding to at least one of the benefit and the obligation.

98. The gaming device of claim 79, wherein the plurality of instructions, when executed by the at least one processor, cause the at least one processor to process a player's response to the offer.

99. The gaming device of claim 98, wherein the plurality of instructions, when executed by the at least one processor, cause the at least one processor to determine whether the player's response indicates an acceptance of the offer.

100. The gaming device of claim 99, wherein the plurality of instructions, when executed by the at least one processor, cause the at least one processor to determine whether the player's response indicates an acceptance of the offer by determining whether the player has touched a predetermined area of a touch screen associated with the wagering game.

101. The gaming device of claim 99, wherein the plurality of instructions, when executed by the at least one processor, cause the at least one processor to cause a second offer to be output to the player if the player's response does not indicate the acceptance of the offer, wherein the second offer defines at least one of a second benefit that is different from the benefit defined by the first offer or a second obligation that is different from the obligation defined by the first offer.

102. The gaming device of claim 99, wherein the plurality of instructions, when executed by the at least one processor, cause the at least one processor to cause the benefit to be provided to the player if the player's response indicates the acceptance of the offer.

103. The gaming device of claim 79, wherein the plurality of instructions, when executed by the at least one processor, cause the at least one processor to cause the benefit to be provided once the player fulfills the obligation.

104. The gaming device of claim 103, wherein the plurality of instructions, when executed by the at least one processor, cause the at least one processor to cause, in connection with providing the benefit, an amount of credits to be added to a, credit meter balance associated with the player, the credits being usable for wagering on the wagering game.

105. The gaming device of claim 103, wherein the plurality of instructions, when executed by the at least one processor, cause the at least one processor to indicate to the player a confirmation that the offer has been accepted.

106. The gaming device of claim 105, wherein the confirmation comprises a physical indicium representative of an acceptance of the offer.

107. The gaming device of claim 106, wherein the physical indicium includes a cashless gaming receipt.

108. The gaming device of claim 105, wherein the confirmation comprises a lottery ticket.

109. The gaming device of claim 103, wherein the plurality of instructions, when executed by the at least one processor, cause the at least one processor to cause the benefit to be provided by causing the benefit to be provided to the player.

110. The gaming device, of claim 79, wherein the plurality of instructions, when executed by the at least one processor, cause the at least one processor to cause the wagering game to be paused while the offer is being outputted.

111. The gaming device of claim 110, wherein the plurality of instructions, when executed by the at least one processor, cause the at least one processor to resume the wagering game if the player responds to the offer in a manner that indicates that the player has not accepted the offer.

112. The gaming device of claim 110, wherein the plurality of instructions, when executed by the at least one processor, cause the at least one processor to resume the wagering game if the player rejects the offer.

113. The gaming device of claim 79, wherein the at least one display device is configured to output a visual representation of the offer.

114. The gaming device of claim 113, wherein the at least one display device is further configured to output outcomes of the wagering game to the player.

115. The gaming device of claim 79, wherein the plurality of instructions, when executed by the at least one processor, cause the at least one processor to:
determine that the player has accepted the offer; and
store an indication of the acceptance, wherein the indication of the acceptance comprises data relating to the player's agreement to perform the obligation within the specified period of time.

116. The gaming device of claim 115, wherein the plurality of instructions, when executed by the at least one processor, cause the at least one processor to access the stored indication of the acceptance.

117. The gaming device of claim 116, wherein the plurality of instructions, when executed by the at least one processor, cause the at least one processor to determine, based at least in part on the stored indication, what types of offers are accepted by players.

118. The gaming device of claim 116, wherein the plurality of instructions, when executed by the at least one processor, cause the at least one processor to determine, based at least in part on the stored indication, what types of offers are accepted by the player.

119. The gaming device of claim 116, wherein the plurality of instructions, when executed by the at least one processor, cause the at least one processor to:
determine whether the player has fulfilled the obligation within the specified period of time; and
determine, based at least in part on the stored indication and at least in part on whether the player has fulfilled the obligation within the specified period of time, whether to assess a penalty to the player.

120. The gaming device of claim 115, wherein the plurality of instructions, when executed by the at least one processor, cause the at least one processor to determine, based at least in part on the stored indication, what types of offers are accepted by players.

121. The gaming device of claim 115, wherein the plurality of instructions, when executed by the at least one processor, cause the at least one processor to determine, based at least in part on the stored indication, what types of offers are accepted by the player.

122. The gaming device of claim 115, wherein the plurality of instructions, when executed by the at least one processor, cause the at least one processor to:
determine whether the player has fulfilled the obligation within the specified period of time; and
determine, based at least in part on the stored indication and at least in part on whether the player has fulfilled the obligation within the specified period of time, whether to assess a penalty to the player.

123. The gaming device of claim 79, wherein the plurality of instructions, when executed by the at least one processor, cause the at least one processor to:
determine whether the player has fulfilled the obligation within the specified period of time.

124. The gaming device of claim 123, wherein the plurality of instructions, when executed by the at least one processor, cause the at least one processor to:
determine, based at least in part on whether the player has fulfilled the obligation within the specified period of time, whether to assess a penalty to the player.

125. The gaming device of claim 79, wherein the obligation comprises an obligation to answer at least one survey question.

126. The gaming device of claim 125, wherein the at least one display device is configured to output the at least one survey question to the player.

127. The gaming device of claim 126, wherein the plurality of instructions, when executed by the at least one processor, cause the at least one processor to pause the wagering game for at least a portion of the time required for the player to answer the at least one survey question.

128. The gaming device of claim 127, wherein the plurality of instructions, when executed by the at least one processor, cause the at least one processor to resume the wagering game when the player fulfills the obligation to answer the at least on survey question.

129. The gaming device of claim 125, wherein the at least one survey question is based on an advertisement output to the player.

130. The gaming device of claim 125, wherein the at least one survey question is based on at least one product previously experienced by the player.

131. The gaming device of claim 79, wherein the gaming device comprises at least one of a personal computer, a portable computer, a palm-top computer, a hand-held computer, a personal digital assistant or a combination thereof.

132. The gaming device of claim 131, wherein the plurality of instructions, when executed by the at least one processor, cause the at least one processor to communicate information associated with the offer over a wireless network.

133. The gaming device of claim 79, wherein the plurality of instructions, when executed by the at least one processor, cause the at least one processor to determine information associated with the player; and cause the offer to be output at least partially based on the information.

134. The gaming device of claim 133, wherein the information comprises information regarding the player's wagering.

135. The gaming device of claim 134, wherein the information regarding the player's wagering comprises information regarding the player's wagering on the wagering game.

136. The gaming device of claim 79, wherein the benefit comprises a product and the obligation comprises a purchase of the product at a specified cost.

137. The gaming device of claim 136, wherein the product comprises a gaming product.

138. The gaming device of claim 137, wherein the gaming product comprises a wager in a specified wagering game.

139. The gaming device of claim 138, wherein the specified wagering game comprises a lottery.

140. The gaming device of claim 139, wherein the plurality of instructions, when executed by the at least one processor, cause the at least one processor to cause a lottery ticket to be output upon the acceptance of the offer by the player.

141. The gaming device of claim 136, wherein the plurality of instructions, when executed by the at least one processor, cause the at least one processor to enable the player to the purchase the product at least partially using a portion of a credit meter balance associated with the player and associated with the gaming device.

142. The gaming device of claim 141, wherein the plurality of instructions, when executed by the at least one processor, cause the at least one processor to cause the offer to be output to the player on the condition that the player have a credit meter balance associated with the gaming device greater than or equal to a minimum balance.

143. The gaming device of claim 142, wherein the minimum balance is equal to the specified cost.

144. The gaming device of claim 141, wherein the predetermined event comprises an initiation of a cash out function on the gaming device by the player.

145. The gaming device of claim 144, wherein the plurality of instructions, when executed by the at least one processor, cause the at least one processor to pause the cash out function pending a response by the player to the offer.

146. The gaming device of claim 144, wherein the plurality of instructions, when executed by the at least one processor, cause the at least one processor to facilitate, if the player's response has indicated an acceptance of the offer, the purchase of the product using at least a portion of the credit meter balance prior to completion of the cash out function.

147. The gaming device of claim 144, wherein the plurality of instructions, when executed by the at least one processor, cause the at least one processor to operate with the display device, if the player's response has indicated an acceptance of the offer, to output:

a first cashless gaming receipt indicating acceptance of the offer; and a second cashless gaming receipt redeemable for an adjusted credit meter balance; the adjusted credit meter balance comprising the credit meter balance at the time of initiation of the cash out function, less the specified cost.

148. The gaming device of claim 147, wherein the first cashless gaming receipt comprises a lottery ticket.

149. The gaming device of claim 79, wherein the predetermined event comprises an initiation of a cash out function on the gaming device by the player.

150. The gaming device of claim 79, wherein the obligation comprises accepting a dining reservation.

151. The gaming device of claim 79, wherein the offer at least partially relates to a benefit or obligation associated with at least one of an owner or operator of the gaming device.

152. The gaming device of claim 79, wherein the offer at least partially relates to a benefit or obligation associated with a third party not associated with an operator of the gaming device.

153. The gaming device of claim 79, wherein the offer at least partially relates to a benefit or obligation associated with a third party not associated with an owner of the gaming device.

154. The gaming device of claim 79, which includes a random number generator for generating random numbers, wherein the plurality of instructions, when executed by the at least one processor, cause the at least one processor to utilize generated random numbers to determine an outcome for a play of the wagering game.

155. The method of claim 29, wherein the cashless gaming receipt comprises a keno ticket.

156. The method of claim 60, wherein the specified wagering game is keno.

157. The method of claim 156, further comprising, upon the acceptance of the offer by the player, outputting a keno ticket.

158. A method comprising:
(a) outputting, via a gaming device operable to facilitate a first wagering game, an offer to a player of the first wagering game of the gaming device, wherein the offer comprises an offer for a purchase of a keno entry at a specified cost, wherein the purchase of the keno entry is independent of any part of any play of the first wagering game being played when the offer is output to the player;
(b) generating, responsive to an acceptance of the offer by the player, a keno ticket confirming the keno entry; and
(c) deducting the cost of the keno entry from a credit meter balance associated with the player of the first wagering game.

* * * * *

UNITED STATES PATENT AND TRADEMARK OFFICE
CERTIFICATE OF CORRECTION

| | | |
|---|---|---|
| PATENT NO. | : 7,878,901 B2 | Page 1 of 1 |
| APPLICATION NO. | : 11/422392 | |
| DATED | : February 1, 2011 | |
| INVENTOR(S) | : Walker et al. | |

It is certified that error appears in the above-identified patent and that said Letters Patent is hereby corrected as shown below:

IN THE CLAIMS:

In Claim 104, column 42, line 15, delete the "," after "a".

In Claim 133, column 44, line 15, replace the ";" after "player" with a ",".

In Claim 147, column 45, line 4, replace the ";" after "balance" with a ",".

In Claim 158, column 46, line 24, replace "playerof" with --player of--.

Signed and Sealed this
Fifth Day of April, 2011

David J. Kappos
*Director of the United States Patent and Trademark Office*